(12) United States Patent
Becker

(10) Patent No.: US 7,693,851 B2
(45) Date of Patent: Apr. 6, 2010

(54) SYSTEMS AND METHODS FOR IMPLEMENTING A SHARED SPACE IN A PROVIDER-TENANT ENVIRONMENT

(75) Inventor: Wolfgang A. Becker, Ludwigshafen (DE)

(73) Assignee: SAP AG, Walldorf (DE)

( * ) Notice: Subject to any disclaimer, the term of this patent is extended or adjusted under 35 U.S.C. 154(b) by 704 days.

(21) Appl. No.: 11/320,791

(22) Filed: Dec. 30, 2005

(65) Prior Publication Data

US 2007/0162452 A1     Jul. 12, 2007

(51) Int. Cl.
G06F 7/00     (2006.01)
G06F 17/00    (2006.01)

(52) U.S. Cl. .................................. 707/100; 707/10

(58) Field of Classification Search ............... 707/1–10, 707/100–104.1, 200–206; 709/217, 219, 709/223, 229; 711/154, 155
See application file for complete search history.

(56) References Cited

U.S. PATENT DOCUMENTS

| | | | |
|---|---|---|---|
| 5,495,610 A | 2/1996 | Shing et al. | |
| 5,625,815 A | 4/1997 | Maier et al. | |
| 5,784,069 A | 7/1998 | Daniels et al. | |
| 5,802,514 A | 9/1998 | Huber | |
| 5,841,972 A | 11/1998 | Fanshier | |
| 5,893,119 A | 4/1999 | Squibb | |
| 5,909,570 A | 6/1999 | Webber | |
| 5,960,181 A * | 9/1999 | Sanadidi et al. | 703/21 |
| 6,006,216 A | 12/1999 | Griffin et al. | |
| 6,018,743 A | 1/2000 | Xu | |
| 6,044,378 A | 3/2000 | Gladney | |
| 6,088,693 A | 7/2000 | Van Huben et al. | |
| 6,094,654 A | 7/2000 | Van Huben et al. | |
| 6,094,684 A | 7/2000 | Pallmann | |
| 6,119,117 A | 9/2000 | Yoda et al. | |
| 6,122,630 A | 9/2000 | Strickler et al. | |
| 6,141,664 A | 10/2000 | Boothby | |
| 6,167,405 A | 12/2000 | Rosensteel, Jr. et al. | |
| 6,205,451 B1 | 3/2001 | Norcott et al. | |

(Continued)

FOREIGN PATENT DOCUMENTS

DE     19734413     1/1999

(Continued)

OTHER PUBLICATIONS

Sterbenz et al., Axon: a high speed communication architecture for distributed applications, Jun. 3-7, 1990, IEEE, vol. 2, 415-425.*

(Continued)

*Primary Examiner*—Jean B Fleurantin
(74) *Attorney, Agent, or Firm*—Finnegan, Henderson, Farabow, Garrett & Dunner, LLP

(57) ABSTRACT

The present invention discloses methods and systems for tenants to execute application software hosted by a provider in a computer-based environment in which a provider may store a shared data structure associated with the application software, such that each of the plurality of tenants has access to the shared data structure. The provider may also distribute, to each of the plurality of tenants, respective tenant-specific data structures for storing data unique to each respective tenant for storage at each respective tenant, and send, based upon a data request generated by the application software, data of the shared data structure a first tenant of the plurality of tenants.

14 Claims, 18 Drawing Sheets

U.S. PATENT DOCUMENTS

| | | | |
|---|---|---|---|
| 6,282,712 | B1 | 8/2001 | Davis et al. |
| 6,385,770 | B1 | 5/2002 | Sinander |
| 6,484,309 | B2 | 11/2002 | Nowlin, Jr. et al. |
| 6,697,846 | B1 | 2/2004 | Soltis |
| 6,763,403 | B2 | 7/2004 | Cheng et al. |
| 6,779,155 | B1 * | 8/2004 | Bahrs et al. ............. 715/526 |
| 6,820,071 | B1 * | 11/2004 | Sullivan ..................... 706/50 |
| 6,823,384 | B1 * | 11/2004 | Wilson et al. ............. 709/225 |
| 7,130,970 | B2 | 10/2006 | Devassy et al. |
| 7,139,774 | B2 * | 11/2006 | Dettinger et al. ......... 707/103 R |
| 7,236,991 | B2 | 6/2007 | Becker et al. |
| 7,370,092 | B2 | 5/2008 | Aderton et al. |
| 7,386,578 | B2 | 6/2008 | Fuerst |
| 7,409,385 | B2 | 8/2008 | Lindsay et al. |
| 2002/0021788 | A1 | 2/2002 | Kasvand et al. |
| 2003/0005109 | A1 | 1/2003 | Kambhammettu et al. |
| 2003/0172316 | A1 | 9/2003 | Tremblay et al. |
| 2003/0233571 | A1 | 12/2003 | Kraus et al. |
| 2004/0122865 | A1 | 6/2004 | Stahl et al. |
| 2005/0065925 | A1 | 3/2005 | Weissman et al. |
| 2005/0080792 | A1 | 4/2005 | Ghatare |
| 2005/0216573 | A1 | 9/2005 | Gutjahr |
| 2005/0216681 | A1 | 9/2005 | Micka et al. |
| 2005/0223022 | A1 | 10/2005 | Weissman et al. |
| 2005/0235107 | A1 | 10/2005 | Ohno et al. |
| 2005/0267975 | A1 | 12/2005 | Qureshi et al. |
| 2005/0283478 | A1 | 12/2005 | Choi et al. |
| 2006/0088027 | A1 | 4/2006 | Becker |
| 2006/0130045 | A1 | 6/2006 | Wesley et al. |
| 2006/0136898 | A1 | 6/2006 | Bosscha et al. |
| 2006/0195449 | A1 | 8/2006 | Hunter et al. |
| 2006/0206834 | A1 | 9/2006 | Fisher et al. |
| 2006/0236408 | A1 | 10/2006 | Yan |
| 2006/0242150 | A1 | 10/2006 | Jogand-Coulomb et al. |
| 2006/0293934 | A1 | 12/2006 | Tsyganskiy et al. |
| 2007/0005634 | A1 | 1/2007 | Selca et al. |
| 2007/0088741 | A1 | 4/2007 | Brooks et al. |
| 2007/0124365 | A1 | 5/2007 | Chen et al. |
| 2007/0150677 | A1 | 6/2007 | Homma et al. |
| 2007/0156650 | A1 | 7/2007 | Becker |
| 2007/0156699 | A1 | 7/2007 | Becker |
| 2007/0156700 | A1 | 7/2007 | Becker |
| 2007/0156714 | A1 | 7/2007 | Becker |
| 2007/0156806 | A1 | 7/2007 | Becker et al. |
| 2007/0156848 | A1 | 7/2007 | Becker et al. |
| 2007/0156849 | A1 | 7/2007 | Becker |
| 2007/0156901 | A1 | 7/2007 | Becker et al. |
| 2007/0156902 | A1 | 7/2007 | Becker |
| 2007/0162451 | A1 | 7/2007 | Becker |
| 2007/0162969 | A1 | 7/2007 | Becker |
| 2007/0174398 | A1 | 7/2007 | Addante |
| 2007/0266031 | A1 | 11/2007 | Adams et al. |
| 2008/0162509 | A1 | 7/2008 | Becker |

FOREIGN PATENT DOCUMENTS

| | | |
|---|---|---|
| DE | 19803697 | 3/2000 |
| EP | 0952521 | 10/1999 |
| EP | 1338928 | 8/2003 |
| JP | 20000347966 A | 12/2000 |
| WO | WO 99/08206 | 2/1999 |
| WO | WO 03107178 | 12/2003 |

OTHER PUBLICATIONS

Xuxian Jiang et al., Protection mechanisms for application service hosting platforms, Apr. 19-22, 2004, IEEE, 656-663.*

Elke Radeke, Marc H. Scholl, "Functionality for Object Migration Among Distributed, Heterogeneous, Autonomous DBS," 1995, IEEE, pp. 58-66.

International Search Report, International Application No. PCT/EP01/06118.

J. Wang et al., "A Technique for Upgrading Database Machines Online," Advances in Information Systems, First International Conference Proceedings, Advis 2000, Izmir, Turkey, (Oct. 25-27, 2000), pp. 82-91.

U.S. Appl. No. 11/647,560, filed Dec. 29, 2006 to Wolfgang Becker et al.

U.S. Appl. No. 11/647,561, filed Dec. 29, 2006 to Wolfgang Becker.

U.S. Appl. No. 11/647,563, filed Dec. 29, 2006 to Wolfgang Becker et al.

U.S. Appl. No. 11/647,564, filed Dec. 29, 2006 to Wolfgang Becker et al.

U.S. Appl. No. 11/647,569, filed Dec. 29, 2006 to Wolfgang Becker et al.

U.S. Appl. No. 11/647,570, filed Dec. 29, 2006 to Wolfgang Becker et al.

U.S. Appl. No. 11/647,571, filed Dec. 29, 2006 to Wolfgang Becker.

U.S. Appl. No. 11/647,574, filed Dec. 29, 2006 to Ulrich Auer et al.

International Search Report, International Application No. PCT/EP01/06118, All Pages.

U.S. Appl. No. 11/647,560, filed Dec. 29, 2006 to Wolfgang Becker et al., All Pages.

U.S. Appl. No. 11/647,561, filed Dec. 29, 2006 to Wolfgang Becker, All Pages.

U.S. Appl. No. 11/647,563, filed Dec. 29, 2006 to Wolfgang Becker et al., All Pages.

U.S. Appl. No. 11/647,564, filed Dec. 29, 2006 to Wolfgang Becker et al., All Pages.

U.S. Appl. No. 11/647,569, filed Dec. 29, 2006 to Wolfgang Becker et al., All Pages.

U.S. Appl. No. 11/647,570, filed Dec. 29, 2006 to Wolfgang Becker et al., All Pages.

U.S. Appl. No. 11/647,571, filed Dec. 29, 2006 to Wolfgang Becker, All Pages.

U.S. Appl. No. 11/647,574, filed Dec. 29, 2006 to Ulrich Auer et al., All Pages.

European Search Report dated Sep. 3, 2007, for the counterpart European Patent Application No. 04104365.4, All Pages.

Tan, Jun et al., "A New Secure Network Upgrade System," Data, Privacy, and E-Commerce, 2007. ISDPE 2007. The First International Symposium on Nov. 1-3, 2007, pp. 421-423; Digital Object Identifier. 10.1109/ISDPE.2007.35.

* cited by examiner

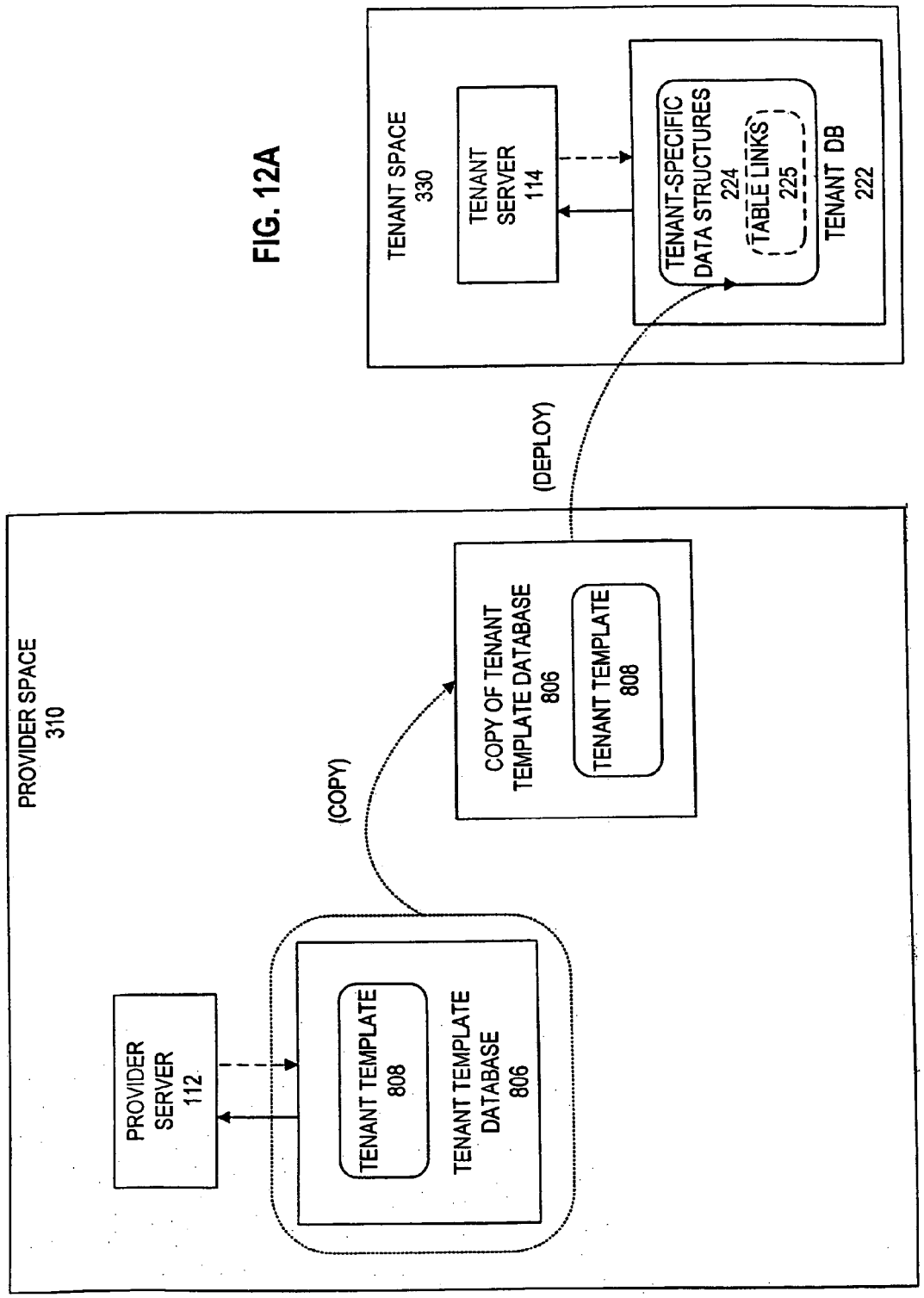

SYSTEMS AND METHODS FOR IMPLEMENTING A SHARED SPACE IN A PROVIDER-TENANT ENVIRONMENT

FIELD

The present invention generally relates to the field of data processing in server systems. More particularly, the invention relates to methods and systems for hosting applications and providing distributed data management for multiple tenants.

BACKGROUND

As the cost to develop and maintain information technology grows over time, business enterprises increasingly outsource their business process functions to third-party providers. For instance, various types of businesses may rely on a provider to host their business application software to reduce the cost and inefficiencies of managing information technology systems that are outside the business's traditional expertise. Providers of hosting services must, therefore, support clients having different sizes and needs. Consequently, there is a demand for providers to offer services that are flexible and scalable to support the provider's variety of clients.

Conventional approaches for hosting solutions include multi-client systems and single-client systems. In a multi-client system, all clients share one data management environment, such as all hardware, databases, and application servers. The provider of the business application in a multi-client system thus sets up and administers each client's system. For example, the provider may be responsible for managing the application software over its lifecycle. This lifecycle management may include software upgrades, system landscape maintenance, and database maintenance. The clients, on the other hand, only need to manage their own data and business transactions. For example, the client does not need to set up an operating system landscape, install software components, or maintain an overall data management system. Furthermore, the client is not involved in any overall system operations, such as copying client data for backup or recovery purposes.

One disadvantage of a multi-client system is that because a large number of clients may share data in a common database, any database maintenance becomes problematic. For example, the provider must coordinate upgrades to minimize the affect of the database's downtime on each of the clients. In addition, software upgrades may require a very high level of testing to ensure reliability for all clients. Thus, as the number of clients increases, the overall upgrade time also increases, which causes the total downtime to increase for all clients.

Yet another disadvantage of the multi-client system is that deploying content to a client requires a great amount of time and manual effort. For instance, the content for all clients is distributed throughout the common database. The provider thus cannot simply copy one client's content on demand as that client's content must first be sorted from all of the other clients' content in the common database.

Finally, another disadvantage of the multi-client system is that the provider cannot use currently available database tools to backup and recover a specific client's content. More specifically, because the provider organizes each clients' content in one common database, rather than a separate physical database, the provider cannot use standard database tools to recover one client's content. The provider must thus restore the entire client environment and client content through a client export/import process, which can take several days, and in some cases, several weeks. This inability to quickly backup or recover data greatly decreases the reliability of client data.

Another solution for hosting multiple clients is the single-client system. In this approach, the provider provides each client with its own system, including, for example, hardware, databases, application servers, applications, and data. A primary advantage of the single-client approach is that the physical separation of client data allows a provider to use standard database management tools to execute a variety of important management functions, such as backup and recovery. In addition, the provider may perform management functions on demand for each client without affecting the other clients.

Because, however, under a single-client system, each client has its own complete system, the client is generally responsible for maintaining its respective system. For example, a client must decide which software components, releases, upgrades, and support packages to install on its system. Therefore, in the single-client system, the client is deeply involved in the maintenance and administration of its system. Consequently, a single-client solution often requires tremendous effort, expertise, and investment from the client to maintain the system.

Accordingly, it is desirable to provide a server solution that enables a provider to host a large number of clients, while enabling separate storage and management of each client's applications and data.

SUMMARY

Embodiments consistent with the present invention relate to methods and systems for a plurality of tenants to execute application software hosted by a provider in a computer-based environment. Consistent with embodiments of the present invention, a provider stores, at the provider server, a shared data structure associated with the application software, wherein each of the plurality of tenants has access to the shared data structure; distributes, to each of the plurality of tenants, respective tenant-specific data structures for storing data unique to each respective tenant for storage at each respective tenant; and sends, based upon a data request generated by the application software, data of the shared data structure a first tenant of the plurality of tenants.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIGS. 12A and 12B illustrate an exemplary tenant deployment process consistent with the present invention;

DETAILED DESCRIPTION

Figure 1A:
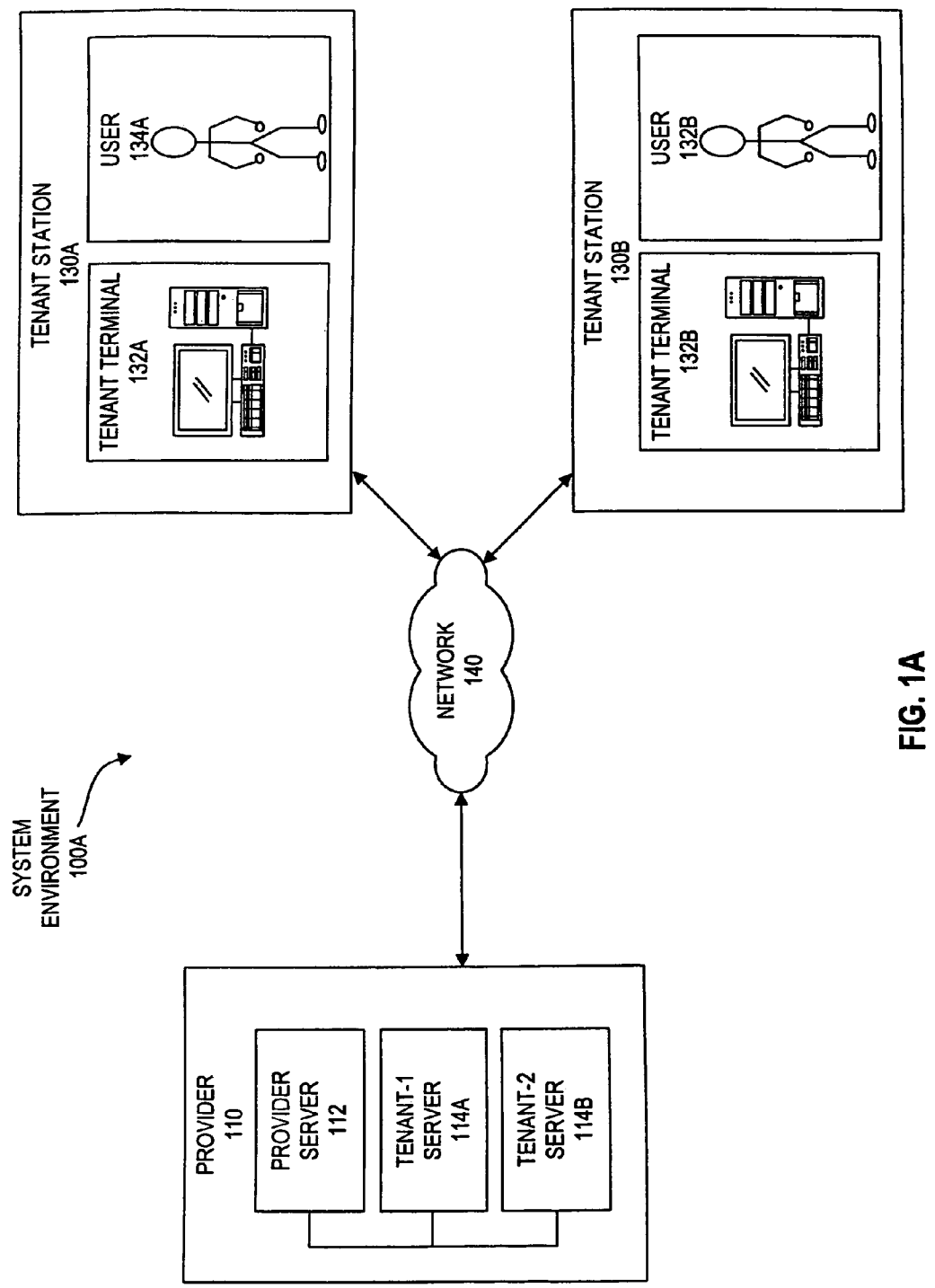
FIG. 1A illustrates a block diagram of an exemplary system environment, consistent with an embodiment of the present invention.

The following description refers to the accompanying drawings. Wherever possible, the same reference numbers will be used throughout the drawings to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments consistent with the present invention relate to systems and methods for hosting application software, such as between a provider and multiple tenants. The term "provider" refers to any device, system, or entity, such as a server, used to host application software. The term "tenant," on the other hand, refers to any device, system, or entity using the hosted application software. As described below, the hosted application software may have one or more data structures. The term "data structure" refers to any type of data arrangement for use by a software application. For example, data structures may include tables, data fields, memo fields, fixed length fields, variable length fields, records, word processing templates, spreadsheet templates, database schema, or indexes. Data structures consistent with the invention are persistent, existing for each tenant-server session, rather than being created transiently each time a tenant-server session is established.

As described below, systems consistent with the invention may identify data structures hosted by the provider as either tenant-specific data structures or shared data structures. Tenant-specific data structures (or tenant-dependant data structures) refer to data structures that may store content specific to a particular tenant. Shared data structures (or tenant independent data structures) refer to data structures that may store data shared between more than one tenant. The provider may then organize the identified data structures within different spaces. For instance, shared data structures may be associated with a provider space and tenant-specific data structures may be associated with a tenant space associated with a particular tenant. As used herein, the term "space" generally refers to any type of processing system or processing sub-system, such as, for example, a system having a database and one or more servers or processors for processing data.

Each tenant may have access to its own tenant-specific data structures and the shared data structures. More specifically, after organizing the data structures into the provider and tenant spaces, a first tenant associated with a first tenant-specific space can then access data contained in the tenant-specific data structures stored at the first tenant-space. In addition, the first tenant may also access data contained in the shared data structures of the provider space. Likewise, a second tenant associated with a second tenant-specific space may access data contained in the tenant-specific data structures stored within the second tenant-space, as well as the data of the shared data structures of the provider space. In other words, each tenant hosted by the provider may access all data structures necessary to execute the hosted application software by accessing its corresponding tenant-specific data structures and the shared data structures. Further, because each tenant's space is isolated (physically or otherwise) from the other tenants' spaces, each tenant's data structures are secure and may be independently managed without impacting the other tenants.

Systems consistent with the invention may host a variety of application software, such as business application software. The hosted application software may thus include general-purpose software, such as a word processor, spreadsheet, database, web browser, electronic mail or other enterprise applications. By way of further example, the hosted application software may be the Customer Relationship Management (CRM) or Supply Chain Management (SCM) products offered by SAP AG of Walldorf, Germany. Business applications may also be composite applications that include components of other software applications, such as those within SAP's xApps family, or may be a custom application developed for a particular tenant.

FIG. 1A is a block diagram of an exemplary system environment 100A, consistent with an embodiment of the present invention. As shown, system environment 100A may include a provider 110 that may communicate with tenant stations 130A and 130B via network 140. For instance, provider 110 may host business application software and/or other application software for use by tenant stations 130A and 130B. To this end, provider 110 and tenant stations 130A, 130B may exchange data over network 140 as part of running or using the hosted application software. While FIG. 1A shows only two tenant stations 130 for purposes of illustration, system environment 100A may include any number of tenants. Moreover, while FIG. 1A shows only one provider 110 and network 140 for communicating with tenant stations 130A and 130B, systems 100A consistent with the invention may include multiple providers and networks for hosting application software to multiple tenants.

As further shown in FIG. 1A, provider 110 may include at least one provider server 112 and a plurality of tenant servers 114A, 114B for hosting a respective one of tenant stations 130. As described in more detail below, servers 112 and 114 may process computer-executable instructions for administering and maintaining the business applications, including the application servers (not shown), databases (not shown), and processors (not shown) upon which the business applications rely. As also described in more detail below, environment 100A may allow provider 110 to perform administration service tasks such as maintaining or upgrading system components, updating or replacing software, and backing-up and recovering data.

Tenant stations 130 may be any device, system, or entity using the business application software hosted by provider 110. Tenant stations 130 may thus be associated with customers of provider 110 that, for instance, acquire (i.e., purchase, lease, license) business application software from provider 110 and, instead of maintaining the software entirely on the tenant's 130 systems, may rely on provider 110 to host, in whole or in part, the business application and its related data or content.

As shown in FIG. 1A, each of tenant stations 130A, 130B may include at least one tenant terminal 132A, 132B enabling users 134A, 134B to access provider 110. Tenant terminal 132, for example, may be one or more data processing systems that perform computer executed processes for providing user 134 an interface to network 140 for accessing data and applications hosted by provider 110. Tenant terminal 132 may be implemented as one or more computer systems including, for example, a personal computer, minicomputer, microprocessor, workstation, mainframe or similar computer platform typically employed in the art. Tenant terminal 132 may have components, including a processor, a random access memory (RAM), a program memory (for example, read-only memory (ROM), a flash ROM), a hard drive controller, a video controller, and an input/output (I/O) controller coupled by a processor (CPU) bus. In exemplary embodiments, tenant station 130 may include a display and one or more user input devices that are coupled to tenant terminal 132 via, for example, an I/O bus.

Tenant terminals 132 may execute applications consistent with carrying out the present invention, including network communications and user interface software. Network communications software may encode data in accordance with one or more of network communication protocols to enable communication between tenant terminals 132 and, at least, a corresponding tenant server 114 over network 140. User interface software may allow user 134 to display and manipulate data and applications hosted by provider 110. The user interface can be, for example, a web-based interface having a web browser or can be a non-web interface, such as a SAP Graphical User Interface (SAP GUI) capable of displaying trace data stored in eXtensisble Markup Language (XML) format or other standard format for data.

Users 134 may be entities (e.g., an employee or automated process) associated with one of tenant stations 130 that accesses their respective tenant's software and data content from provider 110 over network 140.

Network 140 may be one or more communication networks that communicate applications and/or data between provider 110 and tenant stations 130. Network 140 may thus be any shared, public, private, or peer-to-peer network, encompassing any wide or local area network, such as an extranet, an Intranet, the Internet, a Local Area Network (LAN), a Wide Area Network (WAN), a public switched telephone network (PSTN), an Integrated Services Digital Network (ISDN), radio links, a cable television network, a satellite television network, a terrestrial wireless network, or any other form of wired or wireless communication networks. Further, network 140 may be compatible with any type of communications protocol used by the components of system environment 100A to exchange data, such as the Ethernet protocol, ATM protocol, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA), or peer-to-peer protocols. The particular composition and protocol of network 140 is not critical as long as it allows for communication between provider 110 and tenant stations 130.

As described above and in more detail below, system environment 100A may be used to host a tenant's business applications. For example, provider 110 may host software and data for providing payroll functions for a tenant, such as tenant station 130 or tenant space 330. Accordingly, the tenant's employees, such as user 134, may communicate with a respective tenant server 114 over network 140 using tenant terminal 132 to access a payroll application hosted by provider 110. In this example, user 134 may be a payroll officer for the tenant that obtains payroll management services from provider 110. These payroll management services may include hosting of payroll processing software tailored to a tenant's particular business, as well as hosting of the tenant's payroll data (e.g., employee, transactional and historical data). User 134, for instance, may access the payroll software (e.g., for submitting or modifying data content) at provider 110 and/or receive output (e.g. generate reports, issue payments). Furthermore, provider 110 may provide additional services to tenant station 130 including life-cycle management of the tenant's applications and data content including, for example, software upgrades, deployment of new software, and data backup. Moreover, provider 110 may assist tenant station 130 in developing and modifying the payroll application to update the application to meet the tenant's specific needs over time.

Figure 1B:
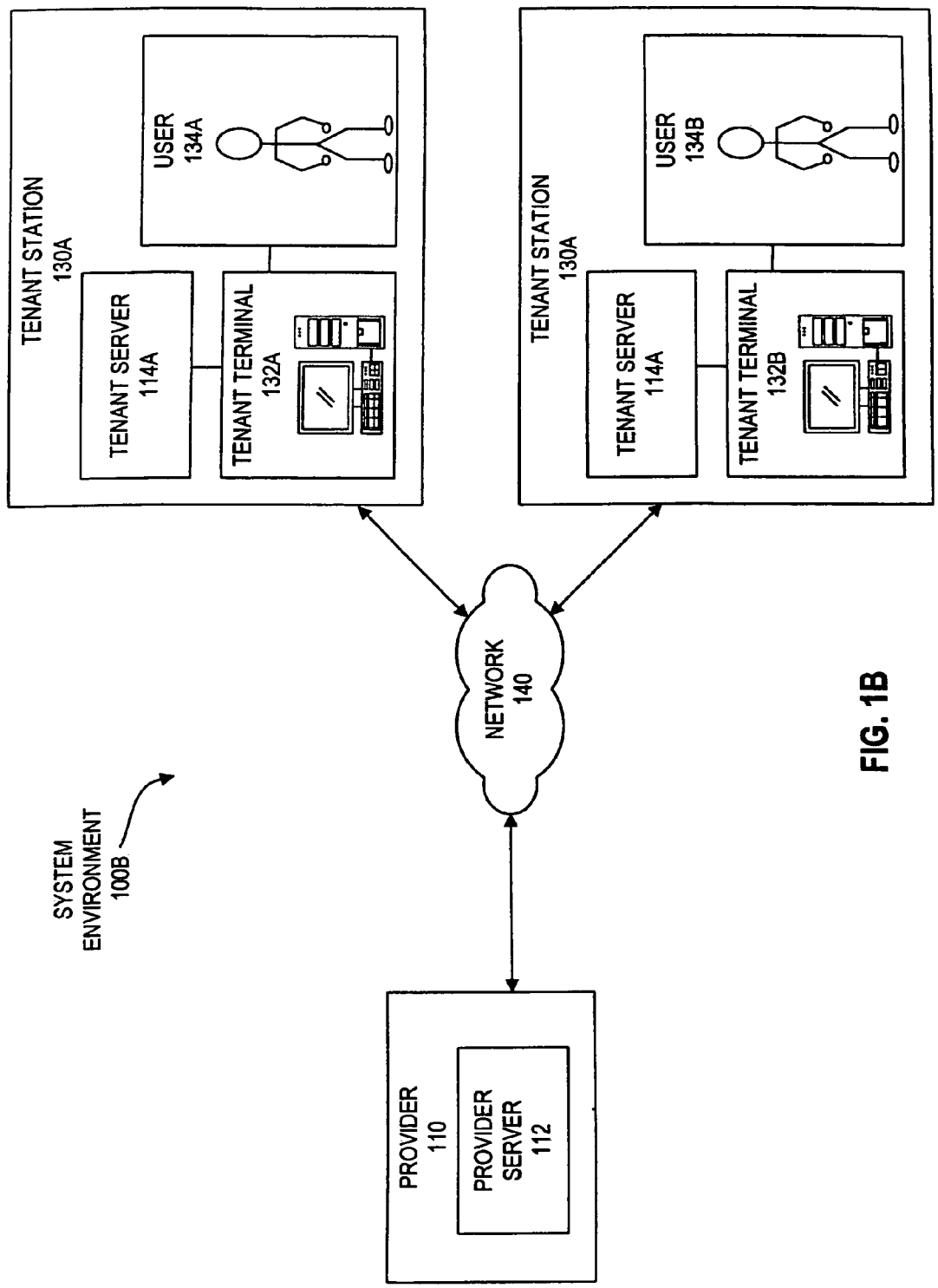
FIG. 1B illustrates a logical block diagram of an exemplary system environment, consistent with an embodiment of the present invention.

FIG. 1B illustrates an exemplary alternative embodiment of system environment 100A shown in FIG. 1A. In particular, system environment 100B may include the same elements 110-134 as system environment 100A, but instead of locating tenant servers 114 at provider 110, tenant servers 114 may be located at each tenant station 130 (e.g., tenant server 114A may be located at tenant station 130A, and tenant server 114B at tenant station 130B). Thus, as shown in FIG. 1B, tenant servers 114 may reside within each tenant station 130. Accordingly, the tenant's employees, such as user 134, may communicate with tenant server 114 over, for instance, a local or wide area network maintained by tenant station 130. Data structures hosted by provider 110 may be accessed by tenant server 114 from provider server 112 over network 140.

Figure 2:
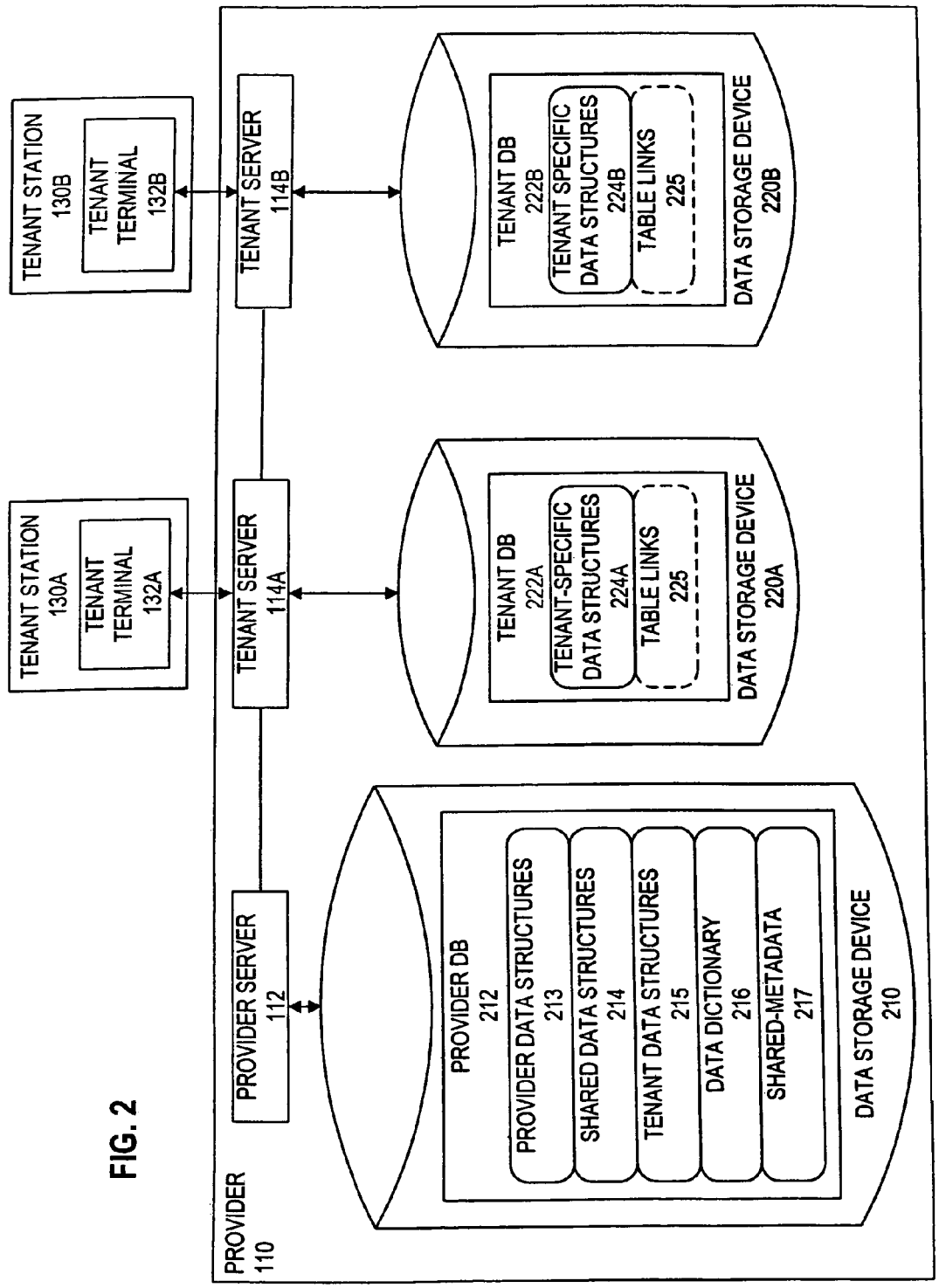
FIG. 2 illustrates an exemplary logical block diagram of a provider, consistent with an embodiment of the present invention.

FIG. 2 shows an exemplary diagram of provider 110, consistent with an embodiment of the present invention. As shown in FIG. 2, provider 110 may include provider server 112 in communication with multiple tenant servers, such as tenant servers 114A and 114B. Each tenant server 114 may, in turn, communicate over network 140 with a respective one of tenant terminals 132. For instance, tenant server 114A may exchange data with tenant terminal 132A associated with tenant station 130A.

Provider server 112 and tenant servers 114 may be may be one or more processing devices that execute software modules stored in one or more computer memory devices. Servers 112 and 114 may include components typically included in a server system, such as a data processor, a network interface and data storage device(s) 210 and 220. For example, servers 112 and 114 may include a personal computer, a minicomputer, a microprocessor, a workstation or similar computer platform typically employed in the art. Furthermore, servers 112 and 114 may execute a plurality of applications including software for managing network communications, providing a user interface, managing databases (e.g. database management system), providing applications over network 140 (e.g., application server), and other software engines consistent with hosting multiple tenants over a network. In some exemplary embodiments, provider server 112 may be a platform running SAP's NetWeaver having a suite of development and integration components, such as the NetWeaver Web Application Server (SAP Web AS), which supports both Advanced Business Application Programming (ABAP) code and Java code meeting the Java 2 Platform Enterprise Edition (J2EE) specifications.

Data storage devices 210 and 220 are associated with provider server 112 and tenant servers 114, respectively. These storage devices 210 and 220 may be implemented with a variety of components or subsystems including, for example, a magnetic disk drive, an optical disk drive, flash memory, or other devices capable of storing information. Further, although data storage devices 210 and 220 are shown as part of provider server 112, they may instead be located externally to provider server 112. For instance, data storage device 220 may be located within each tenant server, or it may be configured as network attached storage (NAS) device or a storage device attached by a storage area network (SAN). In either case, provider 110 may access data storage device 220 remotely over network 140.

Provider server 112, as shown in FIG. 2, may store provider database 212 on data storage device 210. Provider database 212 may further have one or more additional databases that store data structures and/or data managed by provider server 112. By way of example, database 212 may be an Oracle™ database, a Sybase™ database, or other relational database. Provider database 212 may include data of provider 110 and tenant stations 130 organized into various data structures 213-216. As will be described in more detail below, and as shown in FIG. 2, data structures stored in database 212 may include provider data structures 213, shared data structures 214, tenant-specific data structures 215, data dictionary 216, and shared-metadata 217.

Tenant servers 114 may host users 132 at tenant terminals 132, providing access to applications, data and other content associated with a respective tenant server 114. For instance, tenant servers 114A and 114B may each store data structures providing a payroll application, wherein the data structures may store each tenant's specific payroll data (e.g., employees names and salaries). Further, tenant servers 114 may store additional data structures for tailoring the business application for each respective tenant station 130A and 130B.

Tenant databases 222 may further have one or more databases that store information accessed and/or managed by tenant servers 114. Database 222 may be an Oracle™ database, a Sybase™ database, or other relational database. As shown, databases 220 may store tenant database 222 including, tenant-specific data structures 215 and shared metadata 217.

Although servers 112 and 114 are illustrated as being located within a single provider location, one or more of these servers may be located remotely from the others. Alternatively, the functionality of some or all of servers 112 and 114 may be incorporated within a single server. For instance, provider 110 may use a single server having logical partitions that isolate data associated with provider 110 and tenant stations 130, rather than the illustrated physical partitions.

Turning now to the data structures 213-217 stored in provider database 212, provider data structures 213 may include all provider and tenant data structures. Provider data structure 213, for instance, may be a repository storing an undifferentiated mix of data structures for hosting applications in a multiple tenant system. In accordance with the present invention, and as discussed in greater detail below, provider data structures 213 may be organized into categories including shared data structures 214, and tenant-specific data structures 215. In most instances, provider data structures 213 in provider database 212 are only accessible to provider 110 (e.g., the provider's administrators).

Shared data structures 214 may include data and applications that are shared across all tenant station 130 systems. In other words, shared data structures 214 may contain all information that is not specifically associated with a particular tenant, such as tenant station 130A or 130B. For instance, shared data structures may contain general purpose software applications, generic program objects (e.g., user-interfaces, communication protocols), tables of public information (e.g. tax rates for various localities), etc.

Tenant data structures 215 include data and applications that will contain data specific to tenant stations 130. Continuing with the payroll example above, a tenant data structures 215 may define a schema for master data, business configuration data, transactional data and/or applications for each tenant's payroll process including, for instance, customized user-interfaces, tenant-specific scripts, transactional data and employee data and payroll data for tenant station's 130A employees.

Data dictionary 216 may be one or more data structures including metadata describing the contents of provider database 212. Data dictionary 216 may index shared data structures 214 with other data describing provider data structures 213. In addition, data dictionary 216 may include data defining an association between provider data structures 213 and a tenant-specific identifier, thereby identifying each such data structure as a tenant data structure 215. Further, metadata within data dictionary 216 may associate provider data structures 213 with a reference attribute describing a data structure as a tenant-specific data structure and/or a shared data structure. For instance, data dictionary 216 may be a local database located in provider 110. In another exemplary embodiment, data dictionary 216 may be located within a single schema in provider database 212. In yet another exemplary embodiment, data dictionary 216 may be an SAP Advanced Business Application Programming (ABAP) data dictionary located in provider database 212.

Shared-metadata 217 may provide an index of shared data structures 214 and tenant-specific data structures 215 along with other data describing the shared data structures 214. In accordance with some embodiments of the present invention, shared-metadata 217 may include information describing the location of data of shared data structure 214 within provider database 212 and may be used by provider server 112 and/or tenant servers 114 to locate shared data structures 214. Such information may be, for example, a table resource locator, uniform resource locator, Structured Query Language (SQL) identifier, or other pointer to a physical or virtual address of shared data structures 214 within provider database 212.

Tenant database 222 may contain tenant-specific data structures 224 defining parameters of, for example, a tenant-specific environment and tenant-specific application environment (e.g., application server data, tenant master data, tenant transactional data, or initial content used by the tenant). After tenant data structures 215 are exported form provider database 212 to a particular tenant database 224A or 224B, the tenant data structures 215 may thereafter be populated with data content specific to the respective tenant; accordingly, such data structures are tenant-specific data structures. For example, as described above, tenant-specific data structures 215A for tenant station 130A may include a payroll administration application and payroll data for the tenant's employees. Similar information may be stored separately for tenant station 130B in tenant database 220B. Tenant-specific data 224A and 224B are thus stored separate from one another in servers 114A and 114B to ensure each of tenants' 130A and 130B information remains isolated and secure.

In systems consistent with the invention, tenant station 130 may not store shared data structures 214. Instead, tenant station 130 may store identifiers, such as table links 225, that reference shared data structures 214 in provider database 212. For instance, table links 225 may include an alternate name for a table (or any other type of data structure) and/or a logical connection or reference to the data structure. The logical connection may be, for example, a database uniform resource locator, or other pointer to a physical or virtual address of shared data structures 214. In some instances, table links 225 may be referenced by tenant servers 114 in the same manner as other data structures; however, instead of returning data, table links 225 may redirect the reference to the actual location of the referenced data structure at provider server 112. For example, it may be necessary for a tenant application executed by a tenant server 114 to access shared data structures 214 through the use of table links 225. Accordingly, tenant server 114 may access tenant-specific data structures in tenant database 222 and shared data structures 214 in provider database 212 in the same manner and may thus be unaware that shared data 214 is stored outside of tenant database 222. Further, table links 225 may store additional information in association with shared data structures 214 including, for instance, permission data which may enable/disable tenant server 114 from writing data to a shared data structure 214. Because table links 225 are not included in all embodiments of the present invention, they are optional and thus illustrated in FIG. 2 with dashed-boxes.

Figure 3:
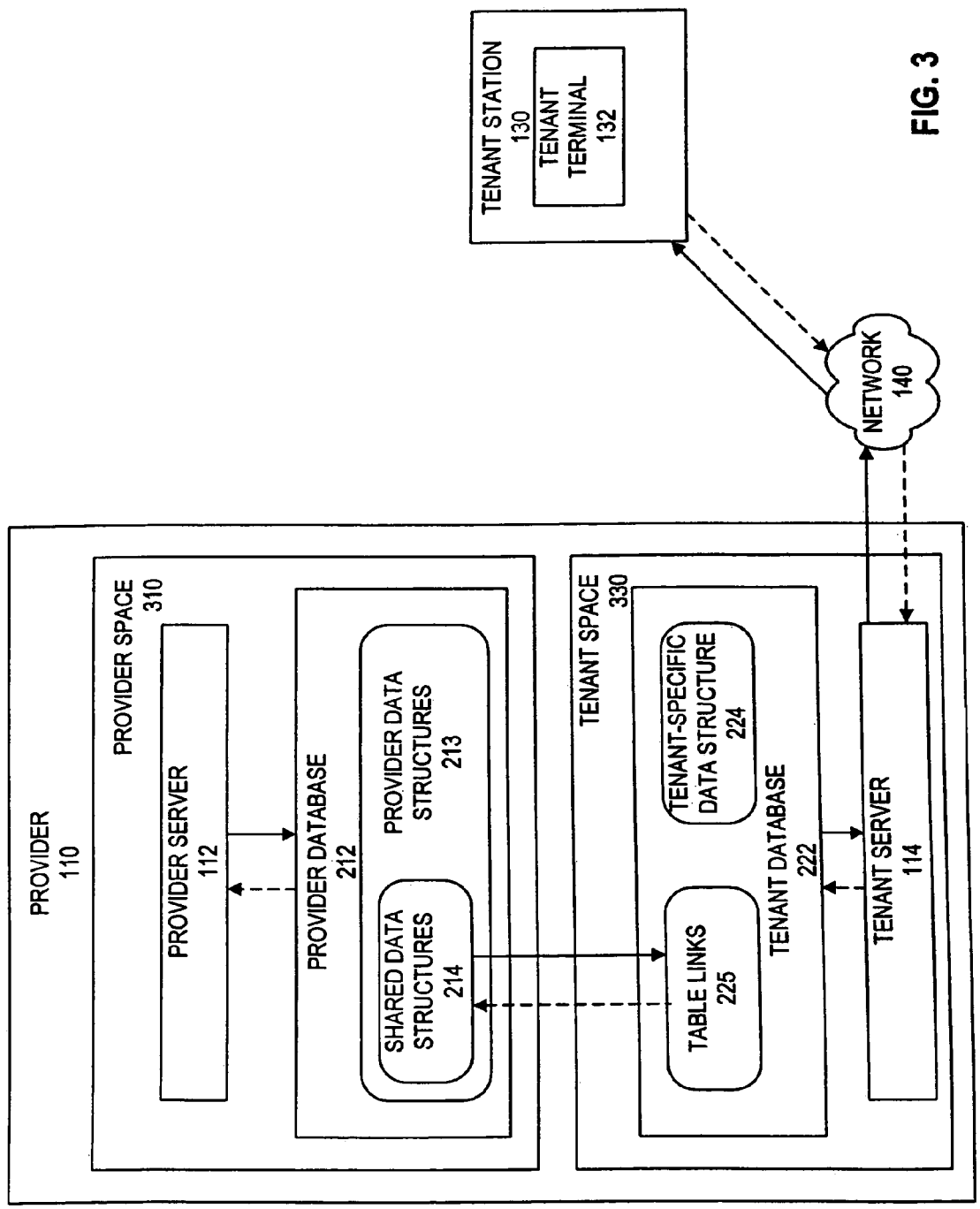
FIG. 3 illustrates an exemplary diagram illustrating a relationship between a provider space and a tenant space, consistent with an embodiment of the present invention.

FIG. 3 is a diagram illustrating a relationship between a provider space and a tenant space, consistent with an embodiment of the invention. More particularly, FIG. 3 illustrates a logical diagram of information passed between components of environment 100. As described above, provider 110 may host business application software for tenant station 130 over network 140. To this end, and as shown in FIG. 3, provider 110 may include a provider space 310 and a tenant space 330. Various spaces are defined according to each space's role within the exemplary overall system environment 100 (e.g., provider space, tenant space). In the present invention, provider space 310 may include provider server 112 and provider database 212, which may further include provider data 213 and shared data 214. Tenant space 330 may have all tenant-specific data structures 215 and table links 225.

As shown in FIG. 3, tenant stations 130 may access the tenant space 330 and, in response, receive data from either the tenant-specific data structures 215 or shared data structures 214. More particularly, tenant server 114, at the request of tenant station 130, may query tenant database 222. If the query references tenant-specific data structures 215, the information is retrieved directly from tenant database 222. If the query references shared data structures 224, the request is redirected by table links 225 and, based on the location data of the table link 225 associated with the requested data structure, retrieved from provider database 212. In other words, table links 225 point tenant servers 114 or tenant database 222 to the shared data structure's 214 location in the provider space. A user 134 at tenant terminal 132 of tenant station 130 may, thus, access all data necessary for executing a hosted business application by either accessing tenant-specific data structure 224 directly via tenant server 114 or by accessing shared data 214 via tenant server 114 and table links 225.

In an alternate embodiment, instead of storing table links 225 in tenant database 222, shared-metadata 217 describing the location of shared data structures 214 may be stored within tenant server 114 itself. In this case, when tenant station 130 requests data, tenant server 114 determines whether the requested data structure is a tenant-specific data structure stored in tenant database 222 or a shared data structure stored in provider database 212, based on shared-metadata 217. In accordance with the determination, tenant server 114 request may retrieve the data structure from the appropriate location as identified in the shared-metadata 217, and provides the requested data to tenant station 130.

Figure 4:
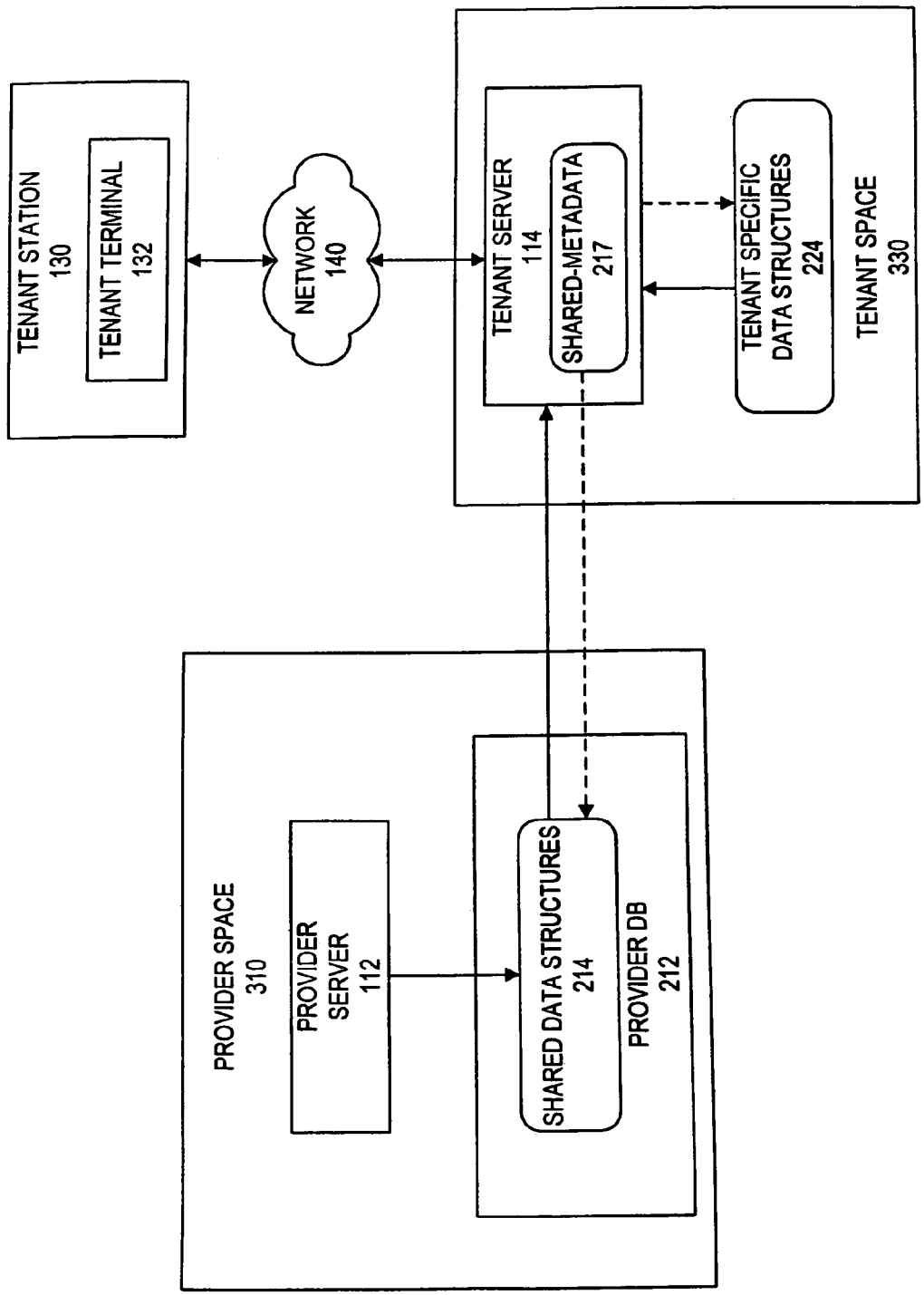
FIG. 4 illustrates an exemplary block diagram of an embodiment consistent with the present invention.

FIG. 4 illustrates an exemplary embodiment consistent with certain aspects of the invention. In accordance with this embodiment, provider 110 may include the aforementioned provider space 310 and provider server 112 As shown, tenant terminal 132 may exchange data with tenant server 114 over network 140. Tenant terminal 132 may request to execute an application or exchange data via tenant server 114. To satisfy the request, tenant server 114 may need to retrieve tenant-specific data structures 215 and/or shared data structures 214. For instance, user 134 may be the aforementioned payroll officer for tenant station 130. When processing a payroll report, tenant server 114 may need access to data associated with specific employees of tenant station 130A, as well as shared data used by any tenant to run certain aspects or functions of the hosted business application software. In this regard, tenant server 114 may thus access tenant-specific employee data stored in tenant-specific data structures 215 (e.g., data describing each employee's salary) and, in addition, access tax data for various localities that, since they are not specific to tenant station 130, are stored in one of shared data structures 214.

Tenant-specific data structures 215 are stored within tenant space 330 and, thus, may be accessed directly from the tenant database (not shown in FIG. 4). However, shared data 214 may be stored within provider space 310 and, therefore, is retrieved from provider space 310. Accordingly, in accordance with the present embodiment, tenant server 114 may store shared-metadata 217 informing tenant server 114 of the location of the shared data structures 214 within the provider space 310. Accordingly, tenant server 114 may access the shared data 214 by requesting the data directly from provider space 310 based on the shared metadata 217.

Figure 5:
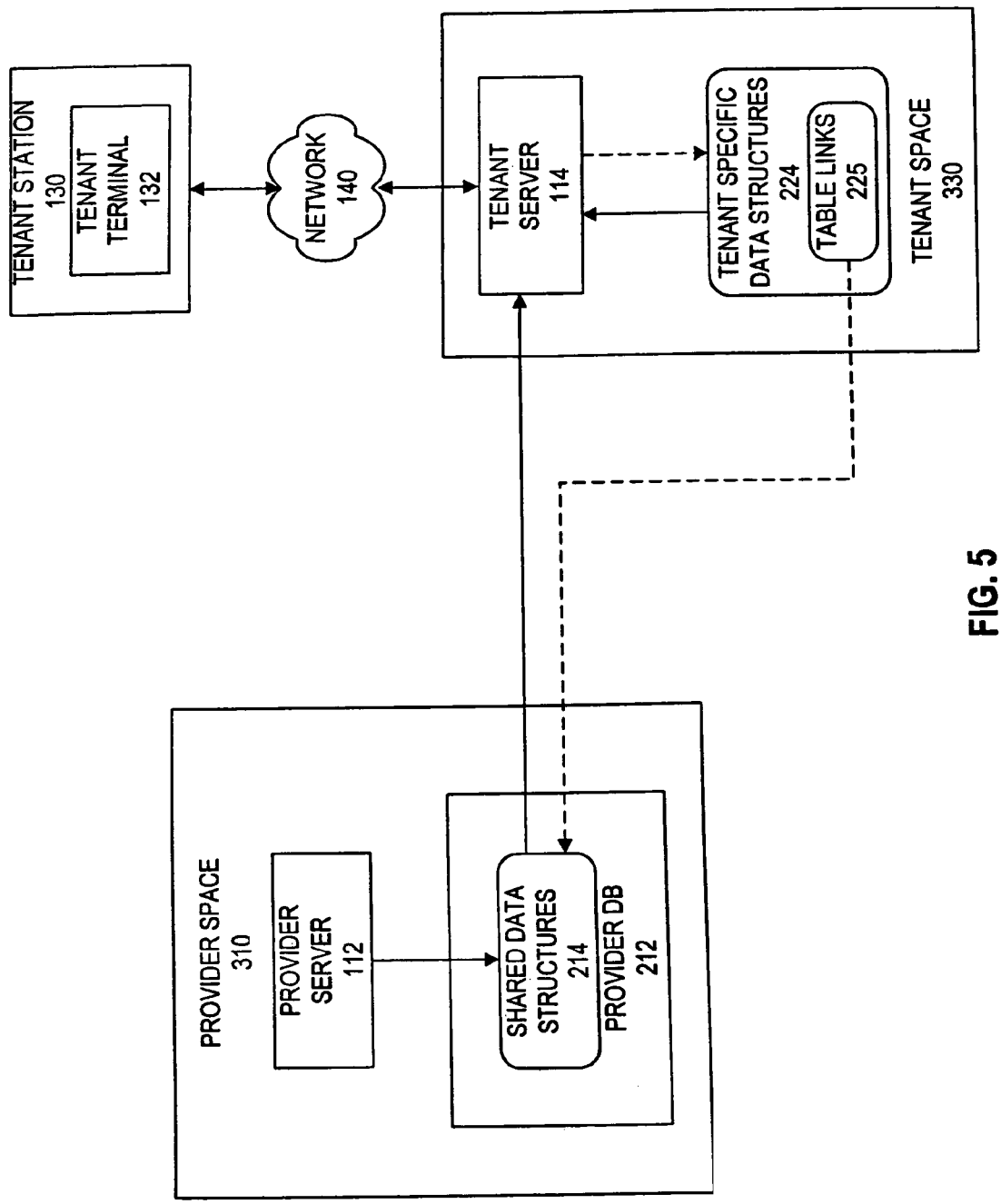
FIG. 5 illustrates an exemplary block diagram of an additional embodiment consistent with the present invention.

FIG. 5 illustrates an additional exemplary embodiment consistent with certain aspects of the invention. In accordance with this embodiment, tenant server 114 in tenant space 330 may access shared data 214 stored in provider space 310. In contrast to the embodiment shown in FIG. 4, the embodiment of FIG. 5 does not include a tenant sever 114 having shared-metadata 217 identifying the shared-metadata locations within provider database 212. Accordingly, tenant server 114 may not be aware that a server request may require accessing shared data stored in shared data structures 214 of provider space 310. Instead, tenant server 114 may retrieve both tenant-specific data structures 215 and shared data structures 214 via the tenant database 222. In this regard, and as shown in FIG. 5, tenant database includes table links 225 that, when accessed by tenant server 114, redirect the server request to the corresponding shared data structure 214 in provider database 112. Tenant-specific data 224 may be accessed directly (i.e., referentially) from, for example, the tenant database by tenant server 114, as described above.

Figure 6:
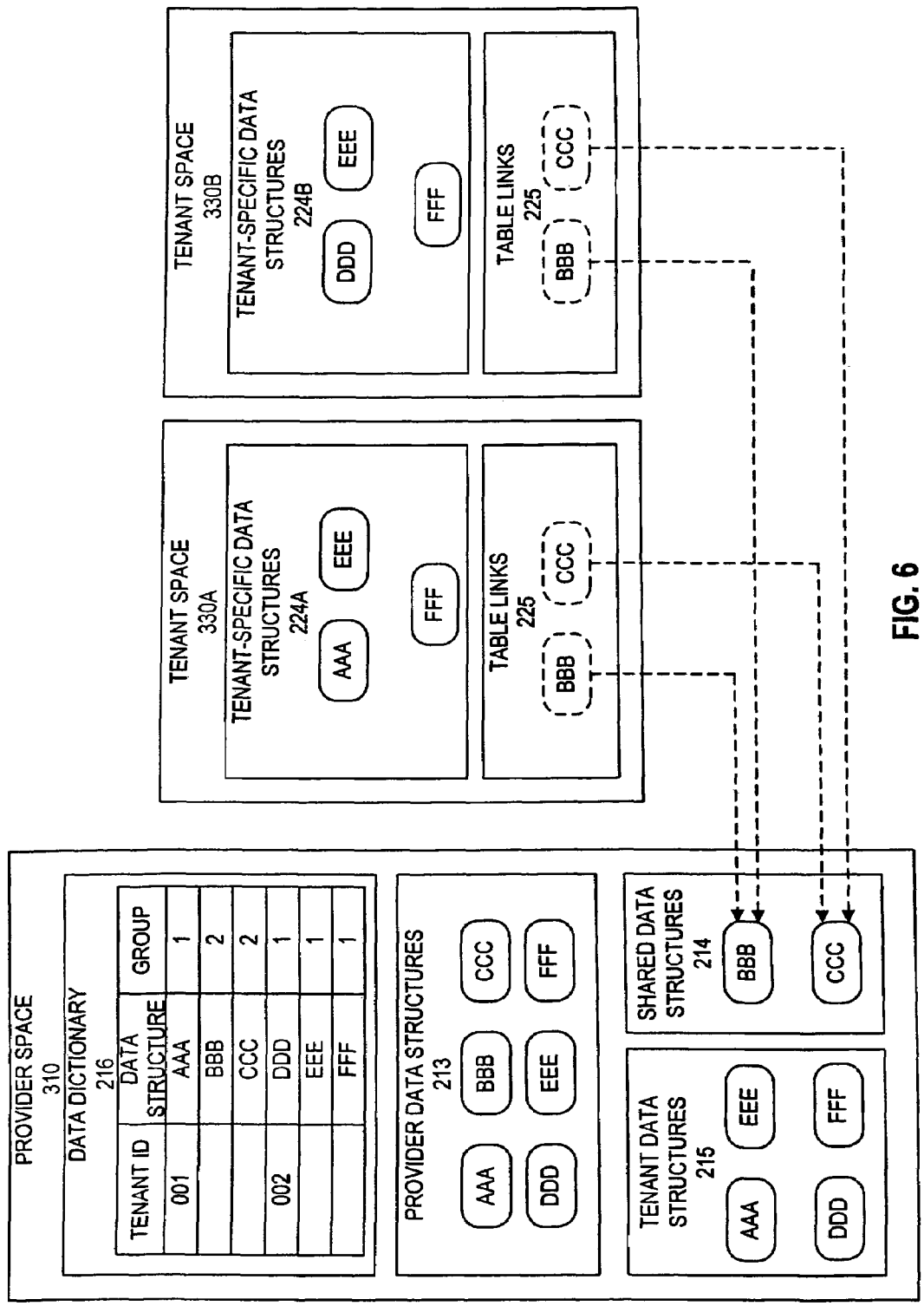
FIG. 6 illustrates a block diagram of exemplary data structures, consistent with an embodiment of the present invention.

FIG. 6 is a block diagram further illustrating the relationship between exemplary data structures of provider space 310 and each tenant space 330. In particular, FIG. 6 illustrates the division of provider data structures 213 between shared data structures 214, tenant-specific data structures 215, and tenant-specific data structures 224A and 224B. As shown, provider space 310 includes exemplary provider data structures 213 (AAA-FFF), shared data structures 214 (BBB, CCC), tenant-specific data structures 215 (MA, DDD, EEE, FFF) and an exemplary data dictionary 216. Provider data structures 213 include copies of all data structures hosted within system environment 100A or 100B. In accordance with an embodiment of the present invention, exemplary provider data structures 213 (MA-FFF) may be exported by provider 110 into subsets having shared data structures 214 (BBB, CCC) and tenant data structures 215 (MA, DDD, EEE, FFF). As noted above, provider data structures are accessible only to provider 110 and, accordingly, shared data structures 214 and tenant data structures 215 are typically copies of the provider data structures 213 stored independently in provider database 212. However, in some instances, shared data structures 214 and tenant structures 215 may instead be aliases referring to the provider data structure 213.

As further shown in the exemplary illustration of FIG. 6, tenant data structures 215 are distributed by provider 110 to tenant spaces 330A and 330B. While tenant data structures 215 (e.g., EEE and FFF) are generally associated with more than one tenant space 330, some of tenant data structures 215 (e.g., MA or DDD) may be associated with only a single tenant. For instance, data structures AAA EEE and FFF, as shown in FIG. 6, may associated with tenant-specific data structures 224A in tenant space 330A and, similarly, data structures DDD, EEE and FFF are associated with tenant-specific data structures 224B in tenant space 330B.

In accordance with embodiments of the present invention, tenant spaces 330A and 330B may also include table links 225 referring to shared data structures 214 (BBB, CCC) stored at provider space 310. In particular, FIG. 6 illustrates data structures BBB and CCC may thus be stored only as part of shared data structure 214 at provider space 310. While structures BBB and CCC do not therefore reside in tenant spaces 330A or 330B, FIG. 6 illustrates that tenant stations 130A and 130B may nonetheless access these data structures from provider space 310 by reference, such as described above with respect to table links 225.

Data dictionary 216 defines attributes of each data structure included within provider data structures 213. That is, when a data structure is added to provider database 212, an entry for that data structure is added to data dictionary 216 along with attributes describing that data structure. For example, an attribute may be associated with a table name, tenant field, or other identifier. Attributes may also include a unique tenant identifier such as a string "tenant." The attributes themselves may be of different types, such as a character type located in a column of a table, a boolean type, a date field, a numeric type, or other type. In accordance with certain aspects of the present invention, one or more attributes may particularly define a data structure as being tenant-specific or shared. Alternatively, one or more attributes may be identified by provider 110 as being indicative of whether a data structure is tenant-specific. In either case, based on at least the attributes defined in data dictionary 216, provider 110 may identify data structures AAA-FFF as being shared data structures 214 or tenant-specific data structures 215. Further, based on the tenant identification, provider 110 may identify tenant-specific data structures 215 as being specific to either tenant station 130A or 130B.

As shown for example, data dictionary 216 may associate data structures AAA-FFF with a tenant identifier (001 or 002) and/or a group (1 or 2). Within provider data structures 213, data structures MA, DDD, EEE, and FFF belong to group 1 which, in this example, provider 110 identifies as correlating with tenant data structures 215. Data structures BBB and CCC belong to group 2 which provider space 310 correlates to shared data structures 214. In addition, data dictionary 216 may also identify which data structure correlates to a particular tenant station 130A or 130B. Thus, as shown in the example of FIG. 6, data structure AM corresponds to tenant station 130A by tenant identification 001, while data structure DDD corresponds to tenant station 130B by tenant identification 002.

Based on data dictionary 216, provider 110 may thus categorize each of the data structures AAA-FFF as part of one of shared data structures 214 or tenant data structures 215. In this example, provider space 310 may determine that data structures BBB and CCC should be classified as shared data 214 because they have no specific association with tenant stations 130A or 130B. Data structures AM, EEE and FFF are categorized as specific to tenant station 130A. Data structures DDD, EEE and FFF are categorized as specific to tenant station 130B.

Based on the above-described identification, provider 110 divides data structures 213 (AAA-FFF) between provider space 310 and tenants spaces 330A and 330B. Accordingly, provider 110 may export data structures AM, EEE and FFF to the tenant-specific data structure 224A location of tenant space 330A. Similarly, data structures DDD, EEE and FFF, may be exported to tenant-specific data structure 224B location of tenant space 330B. In comparison, provider space 310 may associate shared data structures BBB and CCC, which may be accessed by either tenant stations 130A or 130B, or both, as part of shared data structures 214 by provider server 112 or tenant servers 114.

Furthermore, based on the above division of data structures, provider may generate a data structure including the results of the identification and/or the location of each data structure within provider database 212 and/or tenant databases 222. These references may be included, at least in part, in table links 225 and/or shared-metadata 217, thereby enabling the shared data structures 214 and tenant-specific data structures 215 to be located within the system. For example, table links 225 are illustrated in FIG. 6 as part of tenant spaces 330A and 330B. As denoted by the dashed lines, BBB and CCC in table links 225 provide references to BBB and CCC in shared data structure 224.

Figure 7:
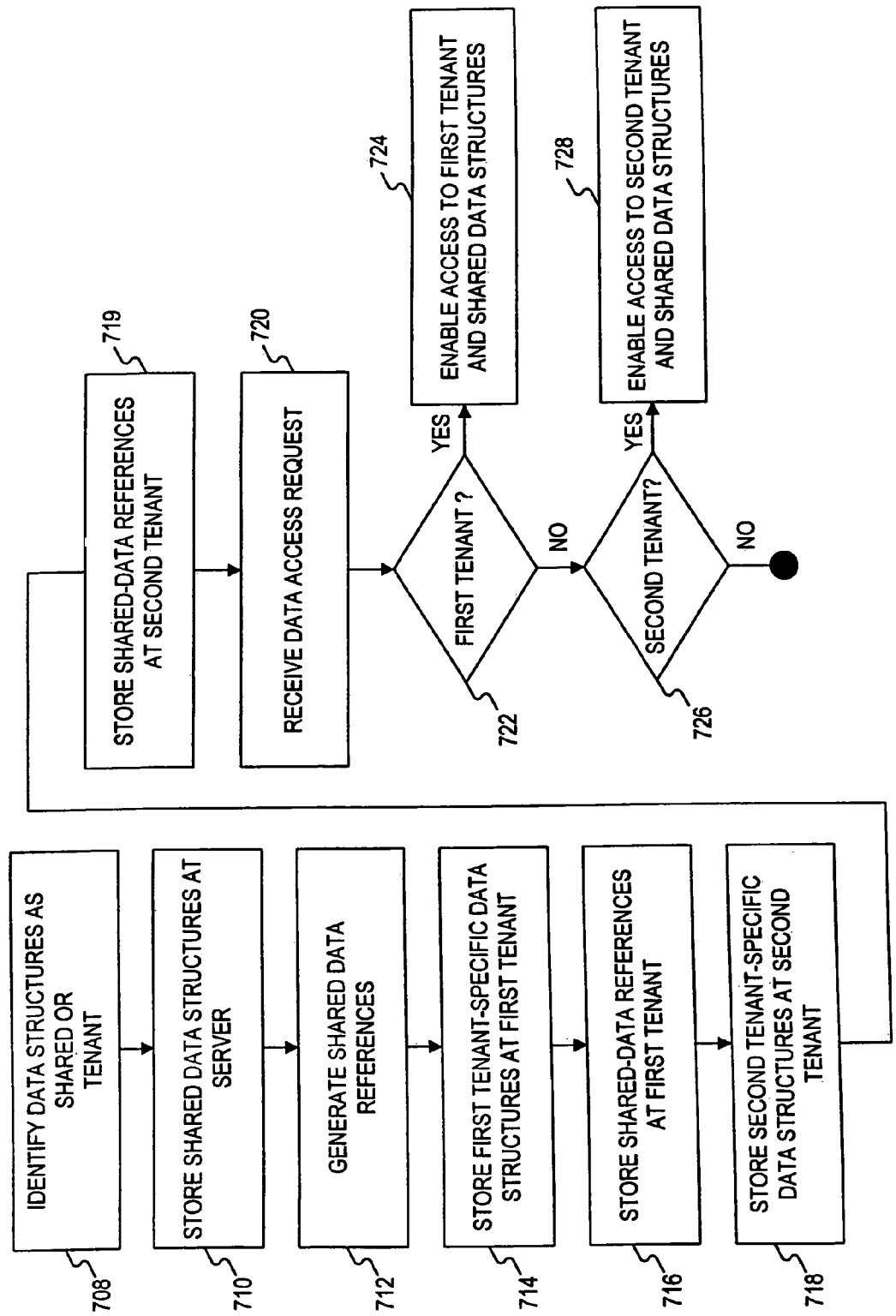
FIG. 7 illustrates a flowchart of an exemplary method for hosting application software, consistent with an embodiment of the present invention.

FIG. 7 is a flow diagram of an exemplary method, consistent with an embodiment of the invention. The method of FIG. 7 may be used to enable hosting of a business application software and/or other application software by using a system environment, such as the system environments presented herein. In this regard, the data structures of a business application software are conventionally not categorized as either shared or tenant-specific. Each of the business application's data structures may thus be stored together within provider database or server without any physical or logical differentiation. As a result, provider 110 may first identify which data structures are either shared data structures 214 or tenant-specific data structures 215 (S. 708). As described above, tenant-specific data structures 215 include those having data particular to one of tenant stations 130. In contrast, shared data structures 214 are those that contain data common to a plurality of tenant stations 130. In one embodiment, the various data structures are identified or classified by using data structure attributes defined in data dictionary 216.

Next, provider 110 may extract shared data structures 214 and tenant-specific data structures 215 from provider data structures 213 in accordance with the identification step described above. First, shared data structures 214 are placed in provider server (S. 710). Notably, because shared data structures 214 may already be stored at provider server, this step may only require placing the shared data structures in a common space of provider server.

In conjunction with extracting the data structures from provider data structures 213, provider 110 generates reference data defining the location of shared data structures 214 and tenant-specific data structures 215 in the provider database (S. 712). As described previously, shared reference data may be generated as shared-metadata identifying the location of shared data structures 214 within the provider database, in accordance with the embodiment illustrated in FIG. 4. Alternatively, the shared reference data may be generated as table links 225 referencing the shared data structures 214 within the provider server in accordance with the embodiment illustrated in FIG. 5.

Next, provider 110 stores a copy of tenant-specific data structures 215A associated with tenant station 130A at tenant server 114 in tenant database 222 (S. 714). Provider also stores, at tenant server 114A, references to the shared data 214 in tenant space 330A. More specifically, in accordance with the embodiment of FIG. 4, provider 110 stores shared-metadata 217 at tenant server 114 (S. 716) enabling server 114 to directly access shared data 214 from provider 110 on a read-only basis. Alternatively, in accordance with the embodiment of FIG. 5, shared-metadata 217 is stored by provider 110 as table links 225 in tenant database 222A, enabling tenant server 114A to indirectly access from provider 110.

In the same manner as above, tenant-specific data structures 215B are stored at tenant space 330B (S. 718), and shared data references are also stored at tenant server 114B (S. 719). As described above, the shared-metadata 217 may be either stored within tenant 114B as shared-metadata, or as table links 225 in tenant database 222B.

Once the tenant-specific data structures 215A and shared data structures 214 are identified and stored in their respective servers 112 and 114, and each data structure may be populated with its corresponding shared and/or tenant-specific data content. Subsequently, when the hosted application software is executed, tenant server 114A may receive a data query from user 134A at tenant terminal 132A associated with tenant station 130A (S. 722). Tenant server 114A, based on its physical separation from tenant server 114B, may only access tenant-specific data structures 215A. Thus, if user 134A is associated with tenant station 130A, tenant terminal 132 may then access only tenant server 114A. In other words, user 134A is isolated or prevented from accessing tenant-specific data structures 215 associated with tenant server 114B and, therefore, may not access tenant-specific data 114B of tenant station 130B.

After receiving user's 134A query at the tenant server 114A, tenant-server 114 accesses tenant-specific data structure 224A stored in tenant server 114A, as well as the shared data structures 214 stored in provider server 112. The shared data structures 214, although not stored at tenant server 114A, may be accessed by tenant server 114A by referencing the shared-data structure 214. As discussed above, in accordance with the embodiment of FIG. 4, tenant server 114A may reference shared-data structure 214 based on shared-metadata 217 stored within tenant server 114A. In accordance with the embodiment of FIG. 5, tenant server 114A retrieves shared data structures 214 by referencing table links 225 stored in tenant database 222A.

Likewise, if provider 110, through tenant server 114B, received a request for access to tenant-specific data (S. 726), provider 110 would enable user 134B to access only the tenant-specific data structures 215B stored in tenant server 114B and the shared data structures stored in provider server 112 (S. 728). Thus, provider 110 also isolates user 134B from accessing tenant server 114A and thereby prevents access tenant-specific data structures 215A. In either embodiment, the division of tenant-specific data 224A and shared data 214 between the provider and tenant spaces is transparent to user 134A.

Figure 8A:
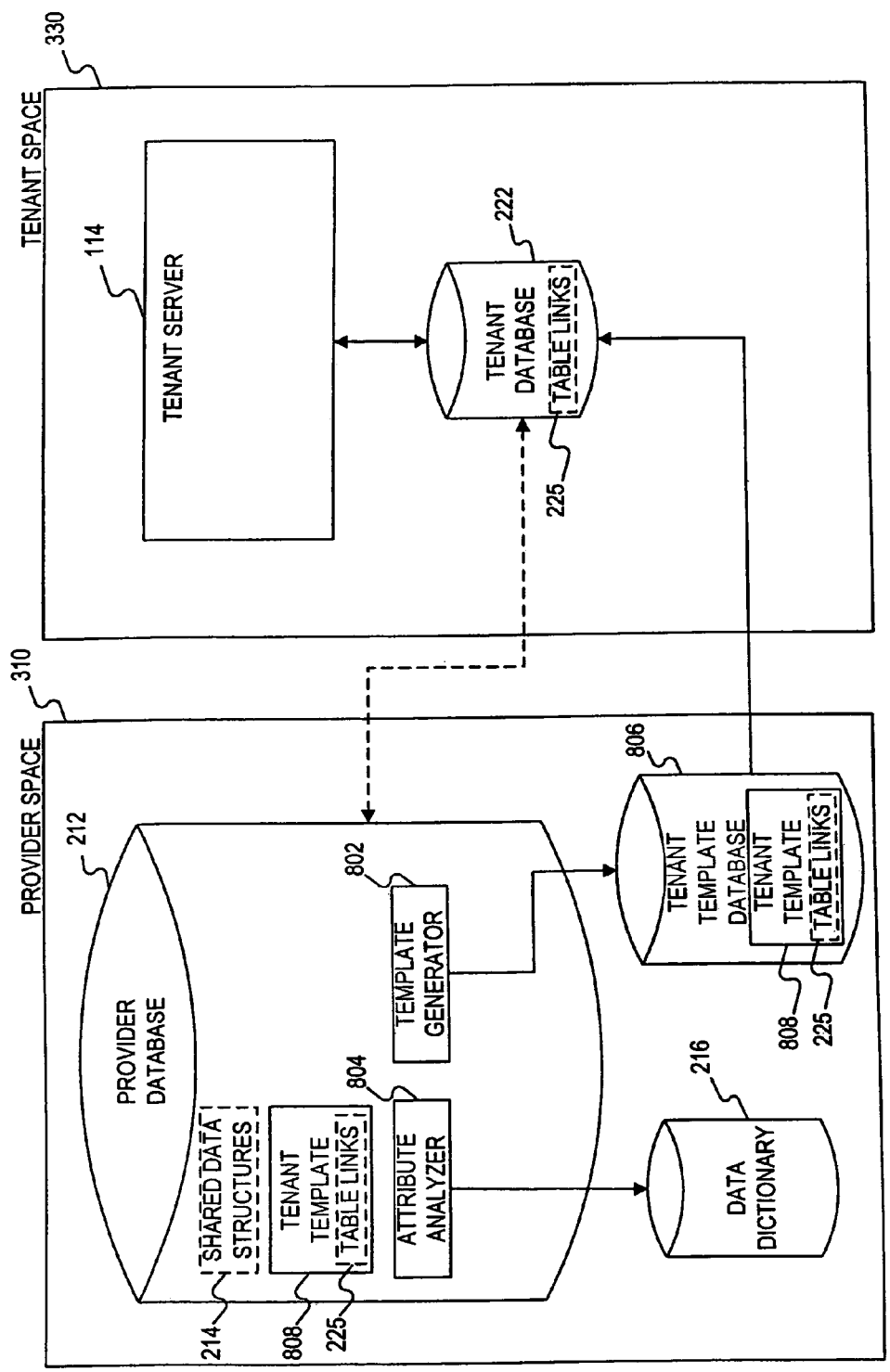
FIG. 8A illustrates an exemplary system environment for further illustrating the generation and use of shared and tenant-specific data structures, consistent with the present invention.

FIG. 8A is a diagram of an exemplary system environment, consistent with aspects of the present invention, for further describing the generation and use of shared and tenant-specific data structures. As shown in FIG. 8A, the exemplary system environment may include a provider space 310 and at least one tenant space 330. While FIG. 8A illustrates only one tenant space 330 for simplicity, embodiments consistent with the invention may include multiple tenant spaces that may communicate with provider space 310 over a network 140 (not shown in FIG. 8A). As shown in FIG. 8A, provider space 310 may include a provider database 212, a data dictionary 216, and a tenant template database 806. While FIG. 8A shows provider database 212, data dictionary 216, and tenant template database 806 as physically separate but interconnected storage devices, these storage devices may be included within one storage device (e.g., partitioned parts of provider database 212).

As shown in FIG. 8A, provider database 212 may further include shared data structures 214, a template generator 802, an attribute analyzer 804, and a tenant template 808, in addition to the other components of provider database 212 described above. In one embodiment, tenant template 808 may be a database schema in provider database 212. Further, tenant template database 806 may be stored in a data volume of data storage device 210. The volume may include a copy of tenant template 808, which may further include table links 225 and tenant-specific data structures 224. The volume may also include other types of data content and data structures (e.g., tenant application server data) that are included in tenant space 330. In one embodiment, tenant template database 806 may be a database instance. As also shown, tenant space 330 may include a tenant server 114, for executing a tenant application, and may include a tenant database 222 having table links 225, in addition to the other components of tenant database 222 described above.

Attribute analyzer 804 may analyze provider data structures 213 using data dictionary 216, to determine which data structures are independent of the tenant (i.e., shared data structures 214) and which data structures are dependent upon the tenant (i.e., tenant-specific data structures 215).

Data dictionary 216 may, therefore, allow for the analysis of provider data structures 213, which, as described above with respect to FIG. 2, may be included in provider database 212. As also described above with respect to FIG. 2, data dictionary 216 may include data structures which define attributes of each provider data structure 213. In one embodiment, these attributes, described in more detail below, may also be associated with provider data structures 213 by data dictionary 216, provider space 310, or tenant space 330.

Figures 8B, 8C:
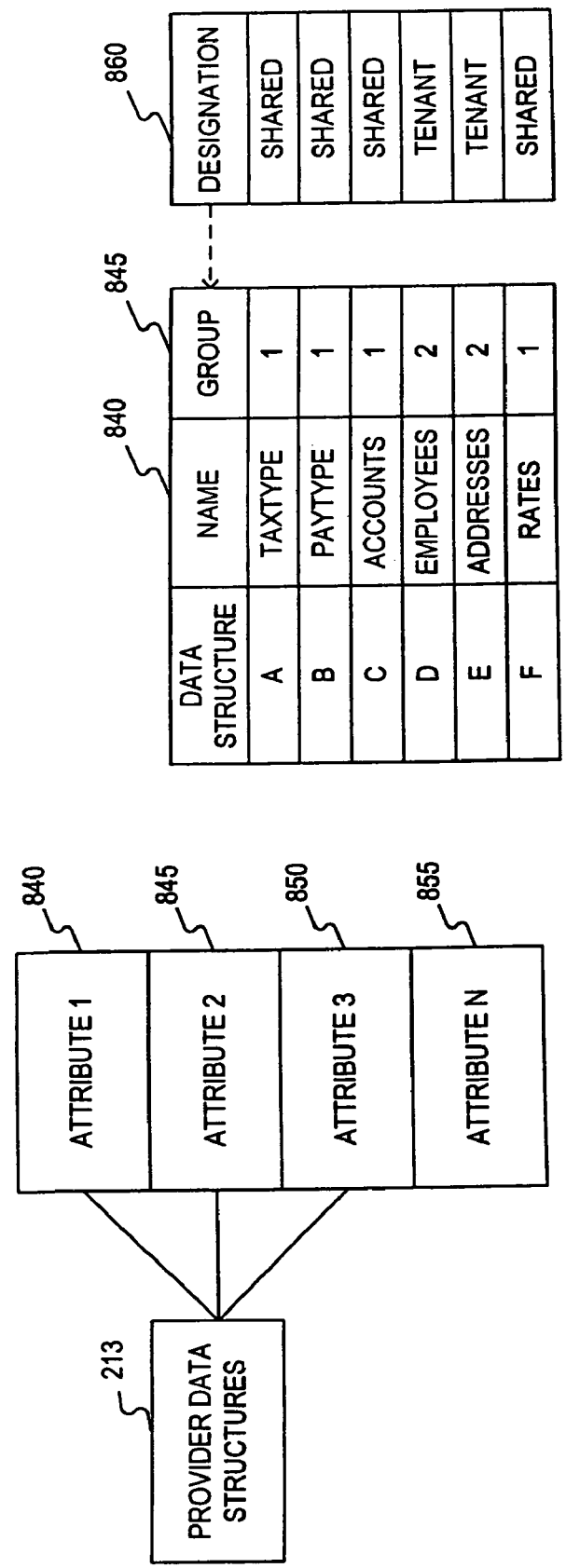
FIG. 8B-8C illustrate exemplary data structures in a hosting environment consistent with the present invention.

FIGS. 8B and 8C illustrate exemplary attributes that may be defined by data dictionary 216. As shown in FIG. 8B and as described above, data structures in data dictionary 216 may include data structures describing provider data structures 213 by using one or more attributes, such as "attribute 1" to "attribute n" (840, 845, 850, and 855 in FIG. 8B). These attributes may correspond to data fields of a provider data structure 213. While data dictionary 216 may define numerous data fields related to provider data structures 213, provider 110 may use only certain data fields related to data structures 213 as "attributes." The attributes used by provider 110 may be those that are useful for determining whether the data structure is a shared data structure 214 or a tenant data structure 215. For example, FIG. 8C illustrates an exemplary embodiment where attribute 840 corresponds to a data field called "NAME." This "NAME" attribute may include fixed-length strings describing, e.g., the name of a corresponding provider data structure 213. Further, the attributes of data dictionary 216 may include a character type, a boolean type, a fixed-length field, a date field, a numeric type, or other type. For example, as shown in FIG. 8C, attribute 845 may be a "GROUP" column of a table in data dictionary 216, which may contain numeric fields (e.g., the group of a table or other data structure, a delivery class, a development class, a transport object, etc.).

Systems and methods consistent with the invention may encode or program data structures in data dictionary 216 to include supplemental data fields, as well. For example, data structures in data dictionary 216 may include at least one data field containing a designation 860. Designation 860 may identify whether a corresponding data structure is a shared data structure 214 or a tenant-specific data structure 224. In one exemplary embodiment shown in FIG. 8C, designation 860 may be a column in a table called "DESIGNATION" containing a fixed-length string, such as "tenant" or "shared." If the designation is "tenant," then designation 860 may further identify which of tenant stations 130 communicating with provider 110 corresponds to the data structure. The designations may also take different forms or values, such as a character value located in a column of a table, a boolean value, a variable-length field, a date field, a numeric value, or other value. The process of determining designations 860 is described in more detail below.

Figure 9:
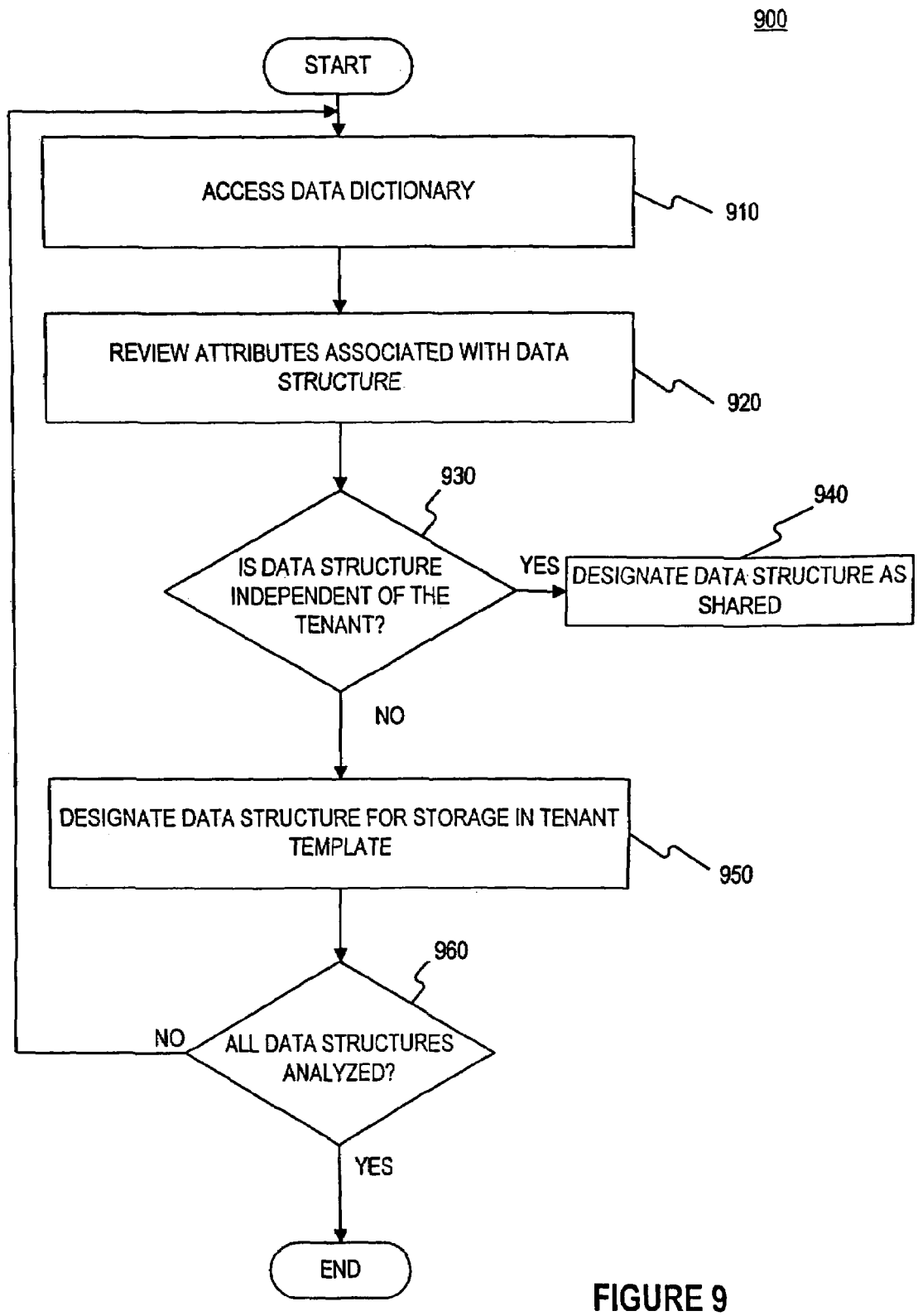
FIG. 9 illustrates a flow diagram of an exemplary process for analyzing a data structure according to a data dictionary.

FIG. 9 illustrates a flow diagram of an exemplary process 900 for analyzing provider data structures 213 using data dictionary 216. For example, when hosting a payroll application, a tenant may require access to tenant-specific data structures 224 containing data about the tenant's employees, and shared data structures 214 containing data about types of tax rates. For example, a tenant may need to access both shared data structures 214 and tenant-specific structures 224 to calculate an amount of tax to deduct from a particular employee's paycheck. To implement exemplary system environments (e.g., environments 100A and 100B) consistent with the invention, provider 110 may use process 900 to determine which of provider data structures 213 to designate as shared data structures 214 or tenant data structures 215.

Provider 110 need not perform process 900 each time a software application is executed. Instead, provider 110 may perform process 900 when, for example, first deploying a new tenant in system environment 100A or 100B. For instance, provider 110 may use process 900 to determine which data structures associated with a new tenant are to be shared data structures 214 or tenant data structures 215. Further, process 900 may be performed for a single data structure, multiple data structures, or entire schemas at once.

As shown in FIG. 9, attribute analyzer 804 may access data dictionary 216 (S. 910). In one exemplary embodiment, data dictionary 216 may be a local database located in provider 110, as shown in FIG. 8A. In another exemplary embodiment, data dictionary 216 may be located within a single schema in provider database 212. In yet another exemplary embodiment, data dictionary 216 may be an SAP Advanced Business Application Programming (ABAP) data dictionary located in provider database 212.

Next, attribute analyzer 804 uses data dictionary 216 to review at least one attribute (e.g., attribute 840) associated with a first data structure processed by analyzer 804 (S. 920). Attribute analyzer 804 may use attribute 840 to determine if the data structure is a shared data structure or a tenant-specific data structure (S. 930). For example, turning back to FIG. 8C, in one exemplary embodiment, attribute analyzer 804 may determine that a data structure A is associated with attribute 845 having a value of group 1. In this exemplary embodiment, because data structure A is associated with group 1, attribute analyzer 804 may determine that data structure A is independent of any particular tenant. In this example, attribute analyzer 804 may make this determination based on another data structure in data dictionary 216 defining which group values of attribute 845 are associated with a tenant-specific data structure and which are associated with a shared data structure. While in this example this determination is based on simply one attribute (e.g., attribute 845), analyzer 804 may make this determination based on a combination of multiple attributes (e.g., attributes 840 and 845).

If attribute analyzer 804 determines that the data structure is independent of any particular tenant, then the data structure may be stored so that it is accessible by multiple tenants. To this end, attribute analyzer 804 may cause the data structure to be stored in shared data structures 214 (S. 940). In one exemplary embodiment, attribute analyzer 804 may assign at least one additional data field to the data structure in data dictionary 216 describing the provider data structure 213 (or to the provider data structure 213 itself) such as designation 860, which may designate the data structure as "shared." Because designation 860 may be assigned to or programmed into the provider data structure 213 itself, provider 110 may later recognize that the data structure has already been determined to be independent of the tenant or "shared," and thus simplify or eliminate the above analysis of analyzer 804.

Attribute analyzer 804 may instead determine that the data structure is tenant-specific. Accordingly, in one exemplary embodiment, provider 110 may store the data structure in a new schema called tenant template 808 (S. 950). Tenant template 808 may be a database schema separate from provider data structures 213, which may be used to generate tenant database 222, and thus may include tenant-specific data structures 215 and table links 225 (described in more detail below). As described above, tenant template 808 may be a database schema located in provider database 212. Further, as shown in, FIG. 8C and as described above, each data structure identified as tenant-specific may also be given a designation 860 including a fixed-length field containing the string "tenant" or "shared," a boolean type "true," a character "0", or other appropriate designation. Designations 860 may be stored in a schema in provider database 212, such as shared-metadata 217. In another embodiment, designations 860 may be assigned to provider data structures 213 themselves. In yet another embodiment, designations 860 may be stored in data dictionary 216.

Next, process 900 may check to confirm whether all provider data structures 213 have been analyzed (S. 960). If not, the process may loop back and continue to analyze other data structures of provider data structures 213.

Figure 10:
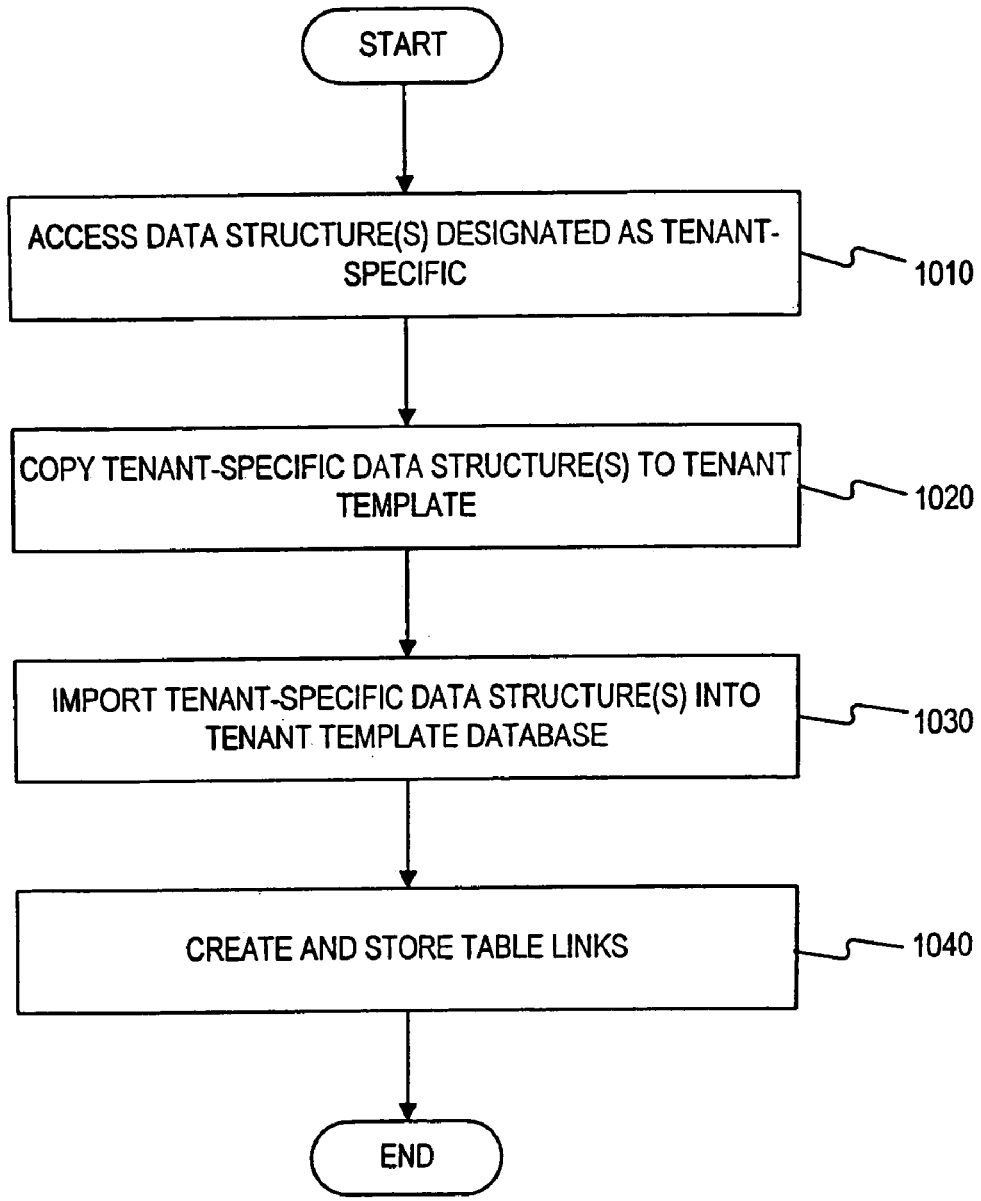
FIG. 10 illustrates a flow diagram of an exemplary process for generating a tenant template consistent with the present invention.

In one exemplary embodiment, attribute generator 802 may generate a new schema called tenant template 808, based on the results of process 900. FIG. 10 illustrates a flow diagram of an exemplary process 1000 for generating tenant template 808. Process 1000 may be used to generate multiple tenant templates 808. For example, one tenant template 808 may be generated for each customer shown in FIG. 10.

Generator 802 may access provider data structures 213 which were determined to be dependent upon a tenant (S. 1010). In this regard, generator 802 may access the data structures in tenant data structures 215 designated as dependent or tenant-specific, as described above with respect to step 950. In one embodiment, generator 802 may use designations 860 to access those data structures that were designated as dependent upon the tenant or tenant-specific. In another embodiment, generator 802 may use designations 860 from data dictionary 216 to determine which data structures were designated as dependent upon the tenant or tenant-specific.

Generator 802 may then import or copy at least one tenant data structure 215 into a new schema called tenant template 808 (S. 1020). Tenant template 808 may be located in its own tablespace, schema, or other data structure within provider database 212, or may be located in its own local database. When copying tenant data structure 215 into tenant template 808, generator 802 may also copy some of the data content from tenant data structures 215.

Next, generator 802 may import or copy tenant template 808 into tenant template database 806 (S. 1030). As described above, tenant template database 806 may also include additional data. Alternatively, in one embodiment, tenant template 808 may be created in tenant template database 806 directly. Generator 802 may perform this function by using database management system tools. Tenant template 808 may be used to deploy, clone, backup, recover, restore, edit, update, and alter tenants. In one exemplary embodiment, as shown in FIG. 8A, tenant template database 806 may be included in a local database located in provider 110.

As described above, multiple tenants may have access to shared data structures 214. For example, in one exemplary embodiment, a tenant application executing on tenant server 114 may need to access data in shared data structures 214. A tenant is not, however, required to store shared data structures 214. Instead, the tenant may store identifiers, such as table links 225, to reference shared data structures 214 included in provider database 212. Therefore, as part of process 1000, generator 802 may create and store table links 225 in tenant template 808 (S. 1040). A process for generating table links 225 is described in greater detail below with respect to FIG. 11.

In one exemplary embodiment, generator 802 may create and store table links 225 in tenant template 808, concurrently with the analysis of process 900. As each data structure designated as independent of the tenant receives its designation 860, for example, generator 802 may create and store a table link 225. In another exemplary embodiment, multiple versions of tenant template 808, corresponding to multiple tenants, may be created and stored in provider 110. Provider 110 may then use these tenant templates 808 for various lifecycle management actions, such as applying patches to or upgrading software, as described more below. Further, in one exemplary embodiment, as also described below, a tenant application or tenant server 820 may use table links 225 to query, retrieve, view, process, or join data from shared data structures 214.

Figure 11A:
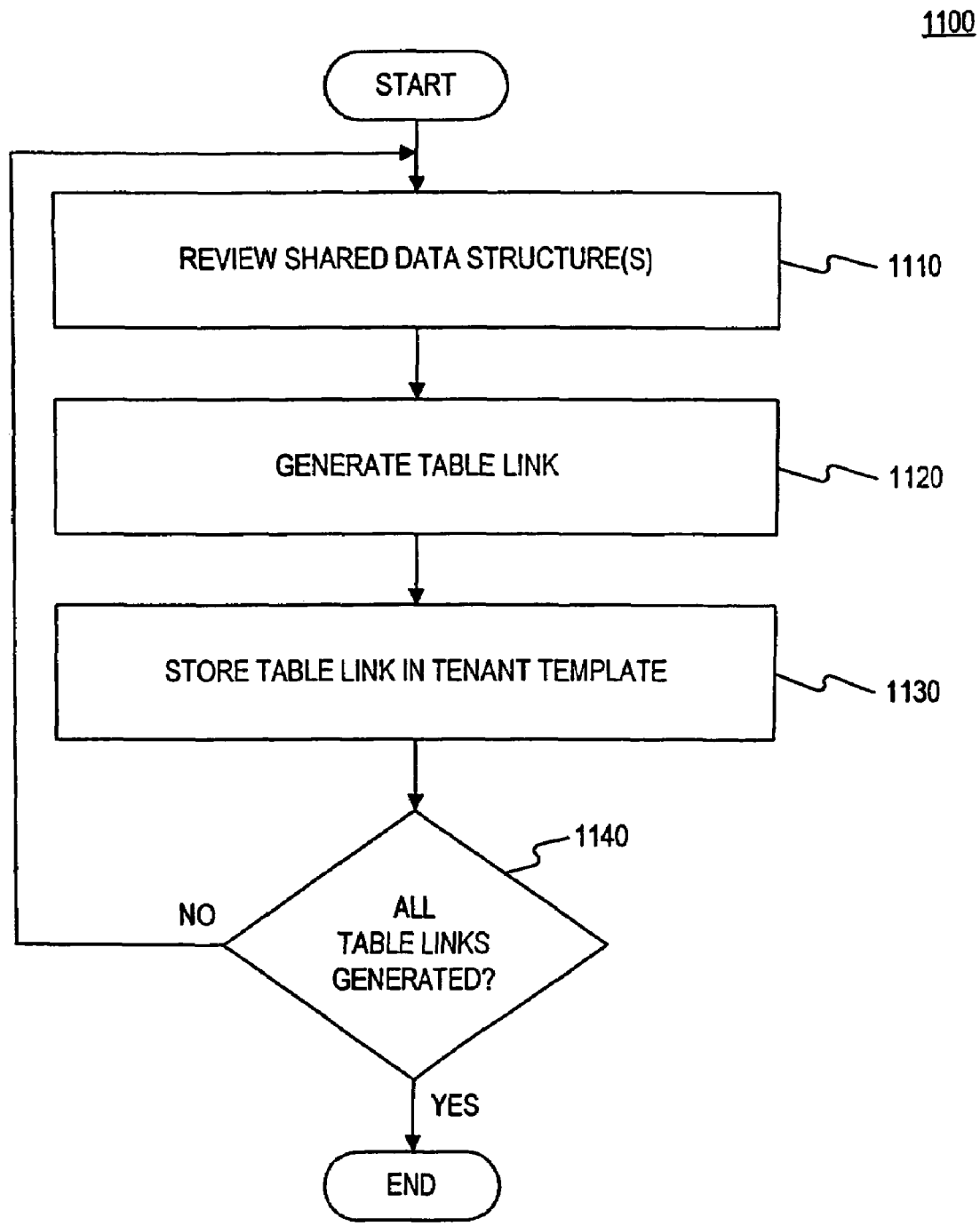
FIG. 11A illustrates a flow diagram illustrating an exemplary process used in generating table links, consistent with the present invention.

FIG. 11A illustrates a flow diagram of an exemplary process 1100 used when generating table links 225. As described above, generator 802 may generate a table link for each shared data structure 214. As shown in FIG. 11, this process may begin by generator 802 first reviewing shared data structures 214 (S. 1110). Generator 802 may then generate a table link 225 (S. 1120) by mapping, for example, a logical connection to an address of the shared data structure 214 and an alternative name for the data structure, such as a table name. A table link 225 may thus include an alternative name for a data structure and a logical connection to that data structure. The logical connection may be any reference that will allow tenant station 130 to access shared data structures 214 located in provider database 212. For example, the logical connection may be a database universal resource locator associated with the data structure. An alternative name may be the same name of the shared data structure 214, or it may be a different name, used to control access permissions for only specific tenants or to control access permissions for all tenants but for only specific purposes. A tenant may thus use table link 225 to access shared data structures 214, as described in greater detail below.

Figure 11B:
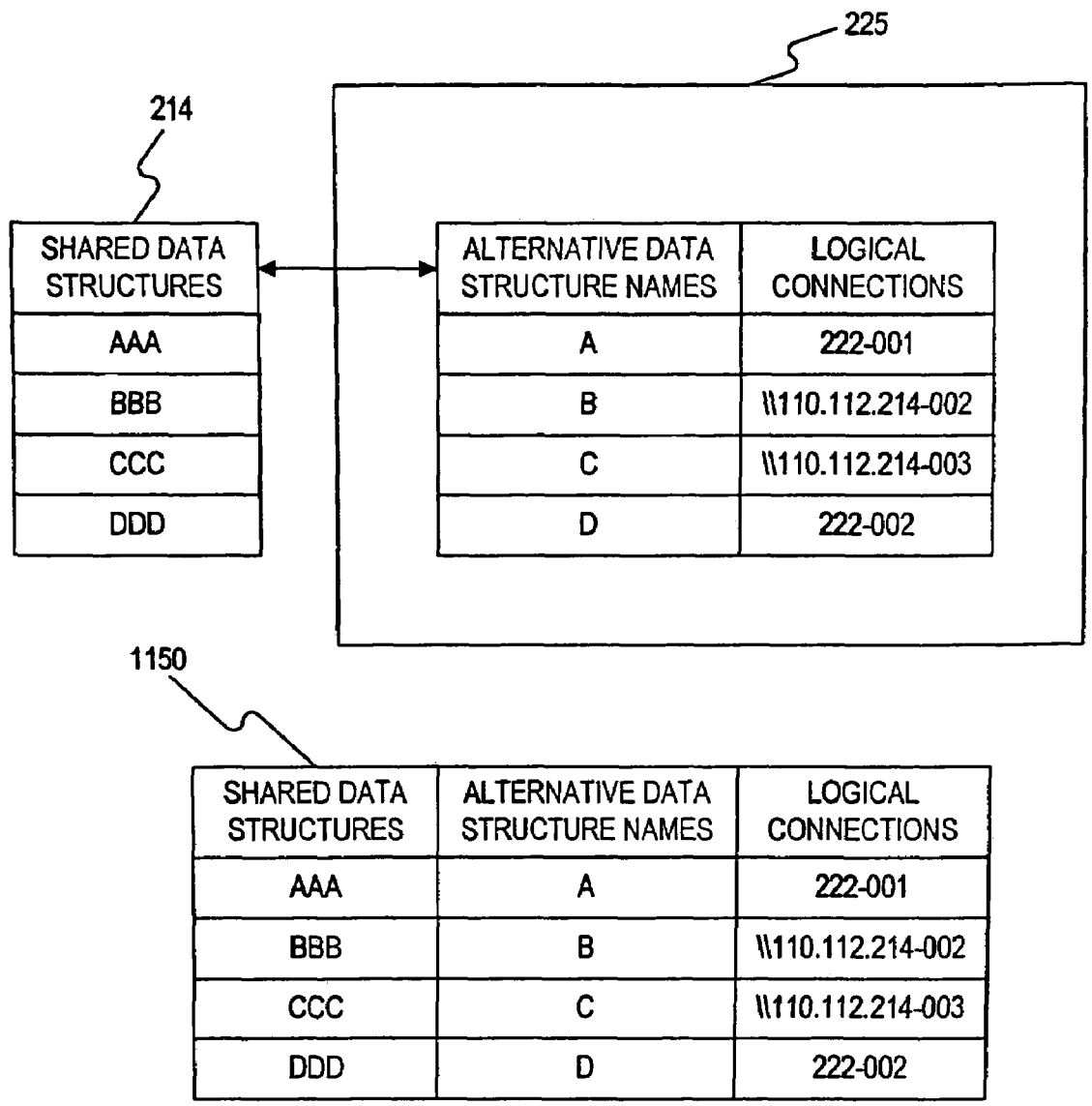
FIG. 11B illustrates exemplary table links consistent with the present invention.

FIG. 11B illustrates an exemplary set of table links 225 and a lookup table 1150. As shown in FIG. 11A, a set of shared data structures 214 may be mapped to table links 225, which include logical connections to the shared data structures 214 and alternative names for the shared data structures 214. Lookup table 1150 may include the names of shared data structures 214 as mapped to the related table links 225. Lookup table 1150 may be stored tenant database 222. In one embodiment, lookup table 1150 may also be stored at provider database 212.

After generating table links 225, template generator 802 may store table links 225 in tenant template 808 (S. 1130). After generating each table link, the process may check to confirm whether all table links have been generated (S. 1140). If not, the process may loop back and continue to review shared data structures 214, generate table links 225, and store the generated table links 225 in tenant template 808, as discussed above. In one exemplary embodiment, multiple table links may be associated with one data structure. For instance, each tenant station 130 may include a tenant server 114 that may call or request a shared data structure by using different parameters, where each set of different parameters may be associated with a particular table link 225.

The process may also generate and store lookup table 1150 in tenant template 808. Lookup table 1150 may include the names of shared data structures 214 as mapped to the related table links 225.

As described above, tenant database 222 may include tenant-specific data structures 224. An exemplary process for exporting tenant-specific data structures 224 to tenant database 222 is described below with respect to FIGS. 12A and 12B. Because tenant database 222 may store its own physical copy of tenant template 808 containing tenant-specific data structures 224 and table links 225, those table links 225 may be available for any query made to tenant database 222. Additionally, because a copy of tenant template 808 may also be stored in provider database 212, those table links 225 may also be available to any query made from tenant database 222 to provider database 212. Lookup table 1150 may also be stored in tenant database 222, and in one embodiment, lookup table 1150 may be stored in provider database 212.

FIG. 12A illustrates an exemplary process for deploying or generating a new tenant. Provider 110 may use this deployment process to generate a new tenant space 330, including a tenant database 222 having tenant-specific data structures 224. As shown in FIG. 12A, provider 110 may generate a new tenant space 330 by copying tenant template database 806 and then deploying the copy to new tenant space 330A including tenant server 114. Tenant template 808 may then be used to create tenant-specific data structures 224 that are populated with data particular to the new tenant.

Figure 12B:
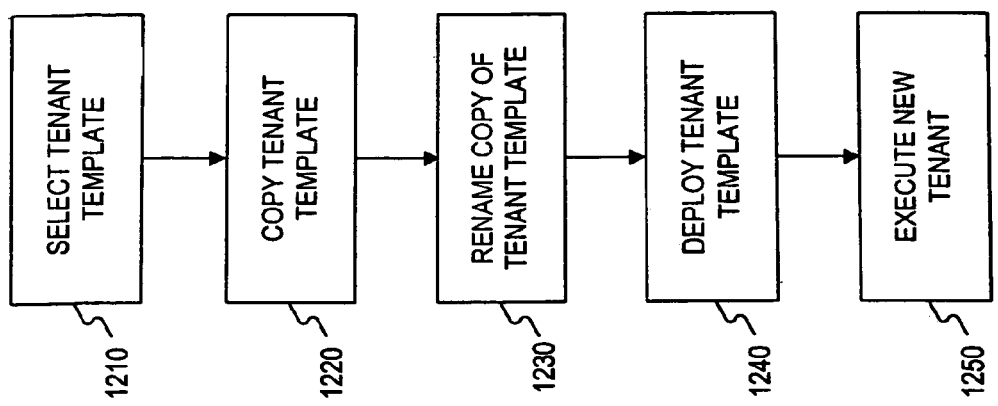

FIG. 12B further illustrates an exemplary process for deploying a new tenant. As shown in FIG. 12B, provider 110 may first select tenant template 808 from tenant template database 806 (S. 1210). The selection of a template 808 may be made by provider 110 from a plurality of templates. The particular template may be selected to provide the new tenant with a processing environment suited to the tenant's particular hosting requirements. For instance, a tenant that is a medium-sized business may require a less complex environment for a hosted business process than a tenant that is a large business. Accordingly, a different tenant template 808 may be selected by provider 110 for the creation of the medium-sized tenant, such as a template 808 corresponding to data structures associated with a less complex version of the hosted application software.

After the selection of template 808, provider 110 may create a copy of the tenant template database 806 containing the selected template 808 for deployment to tenant space 330 (S. 1220). The copy may be generated by one of several methods. In one method, a copy of tenant template database 806 may be created using, for example, database commands (e.g., "copy" or "restore backup"). In a second method, tenant template database 806 may be created by copying one or more data volumes that include tenant template database 806, as well as data structures, applications and other contents that are included in new tenant space 330. In this case, a copy may be generated by making a physical copy of the data volume containing the selected template, such as by performing a snapshot operation on the selected volume. In a third method, a new tenant space 330 may be created by exporting the tenant template 808 in a new tenant database 222 and later installing the data and applications that are included in the tenant space 330.

Once the copy of tenant template database 806 is created, the copy and its contents (e.g., the template's folder structure) may be associated with a unique identifier assigned to the new tenant by provider 110 (e.g., a system ID) (S. 1230). The unique identifier enables the provider to associate content and data with tenant-specific data structures 224. Further, the identifier may be used later by the provider to individually address and manage each tenant space 330. Although provider 110 may later change the names or identifiers of data structures within the copy of tenant template 808 to reflect the identifier assigned to the tenant, provider 110 would not later change the content of these data structures in exemplary embodiments. After renaming the copied tenant template, provider 110 may deploy the renamed tenant template 808 at tenant space 330 (S. 1240). As part of this deployment, the tenant template 808 may be exported to the new tenant, and file names, user names and other profile parameters may be changed in accordance with the new tenant's name or identifier. Once deployed, the data structures 224 may be populated with initial data and other content as defined by the tenant template 808 and/or supplied by the tenant. For instance, in accordance with the aforementioned payroll example, some tenant-specific data structures 224 may be populated with the tenant's payroll data such as current employee information, historical data and other content associated with the tenant's business process.

Next, the newly deployed tenant space 330 may begin execution of the hosted business process at tenant server 114, at which time the identity of the new tenant space 330 is registered with provider 110 (S. 1250). In particular, a user 134 may execute a business application hosted by provider 110 through a user-interface provided at tenant terminal 132. In accordance with the disclosed invention, if user 134 submits a query to tenant server 114 for data specific to the tenant, such data may be retrieved from the tenant-specific data structures 224 stored within tenant space 330. However, if the query submitted by user 134 requires data common to more than one tenant, the data may be retrieved by redirecting the query to retrieve data from shared data structures 214 stored at the provider space 310. Access to shared data structures 214 in provider database 212 may be limited by provider server 212 based upon whether a tenant's unique access identifier received from tenant space 320 is registered with provider 110.

As described above, tenant template 808 may also include table links 225. Therefore, when provider 110 deploys a new tenant, tenant database 222 may also get a copy of table links 225 used to access shared data structures 214. As described below, tenant server 114 may execute a query for a data structure by using table links 225.

Figure 13:
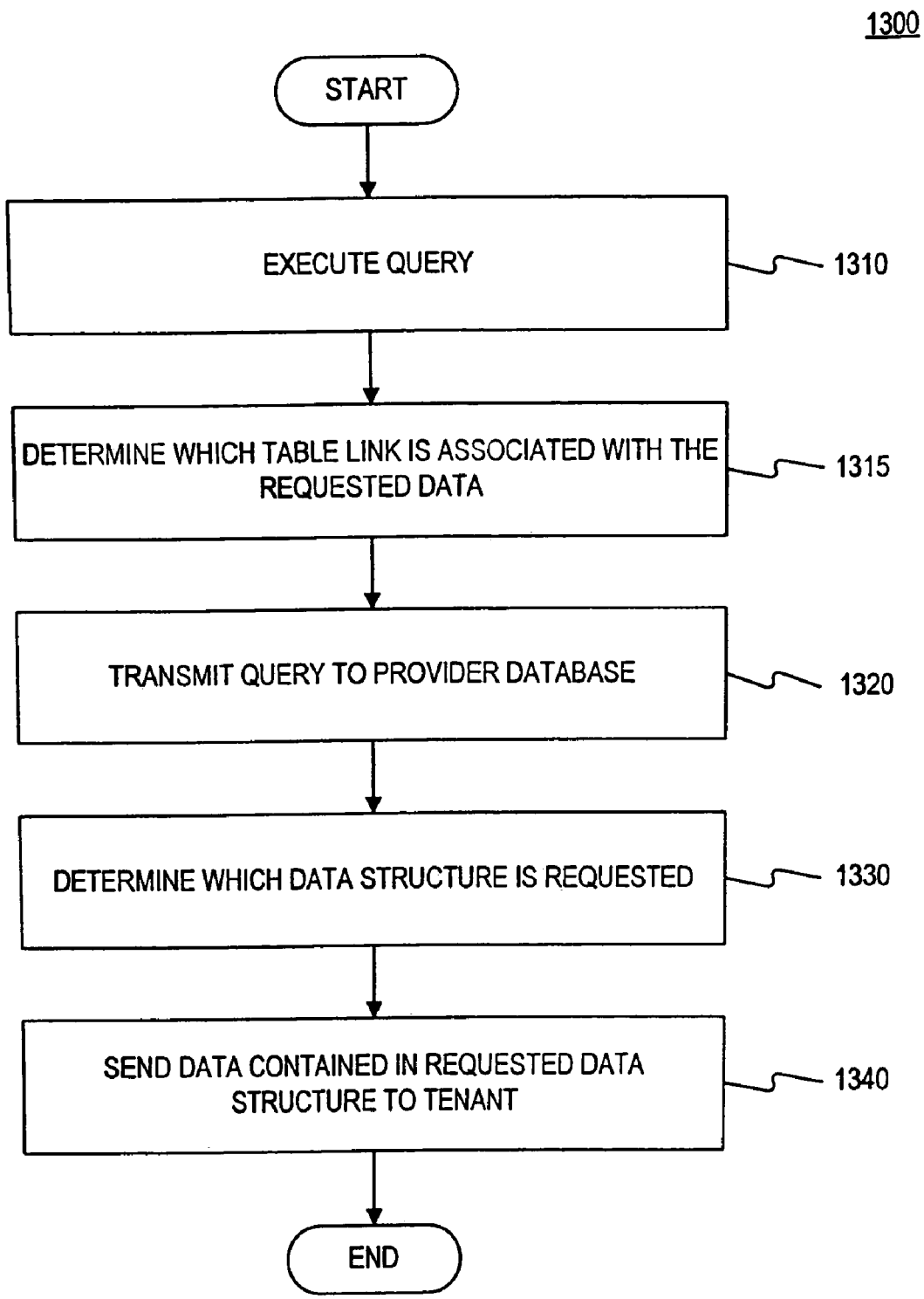
FIG. 13 illustrates a flow diagram of an exemplary process for executing a query for a shared data structure, consistent with the present invention.

FIG. 13 illustrates an exemplary process for querying a database for a data structure by using a table link 225. As described above, tenant server 114 may need to access shared data structures 214 stored in provider database 212. However, in an embodiment consistent with FIG. 5, when tenant server 114 may receive a data request, it may transmit a query to tenant database 222 for the requested data including a data structure name. In other words, tenant server 114 may query tenant database 222 (S. 1310) in response to a received data request. The query to tenant database 222 may include a SQL statement requesting data, such as, for example, a tax rate for a particular employee of the tenant. For example, turning to FIG. 14, if tax table 1400 is named "T" and employee table 1402 is named "E", the SQL statement "SELECT T.TAXRATE FROM E, T TAXRATE WHERE E.EMPNO=T.EMPID and EMPNO=1007" may request Peter Smith's income tax rate from table 1400. Generating such SQL statements is well known in the art and is, therefore, not described in further detail here.

After receiving the query from tenant server 114, tenant database 222 may recognize that the requested data (for example, the requested tax rate from table tax table 1400 called "T") is not available to be queried at tenant database 222. In such a case, tenant database 222 may first use the requested data structure name to examine lookup table 1150. Tenant database 222 may use lookup table 1150 to determine which table link 225 is related to the requested data structure name, as shown in FIG. 11B (S. 1315).

Based on lookup table 1150, tenant database 222 may transmit another query to provider database 212 (S. 1320). The query to provider database 212 may use table link 225 to retrieve data from the shared data structure requested by tenant server 114. In one embodiment, the query to provider database 212 may include only the logical connection from table link 225. In another embodiment, the query to provider database 212 may include only the name of the shared data structure requested by tenant server 114. In yet another embodiment, the query may include table link 225 (which, as described above and as shown in FIG. 11B, may include an alternative name for the data structure containing the requested data, as well as a logical connection to that data structure).

Provider database 212 receives the query and determines which shared data structure 214 is requested (S. 1330). Provider database 212 may then send any data contained in the requested shared data structure 214 to, for example, tenant database 222 (S. 1340). Tenant server 114 may then retrieve the requested data from tenant database 222 (not shown). Once the data is available at tenant database 222, tenant station 130 may perform any desired actions or operations by using the requested data.

Figure 14:
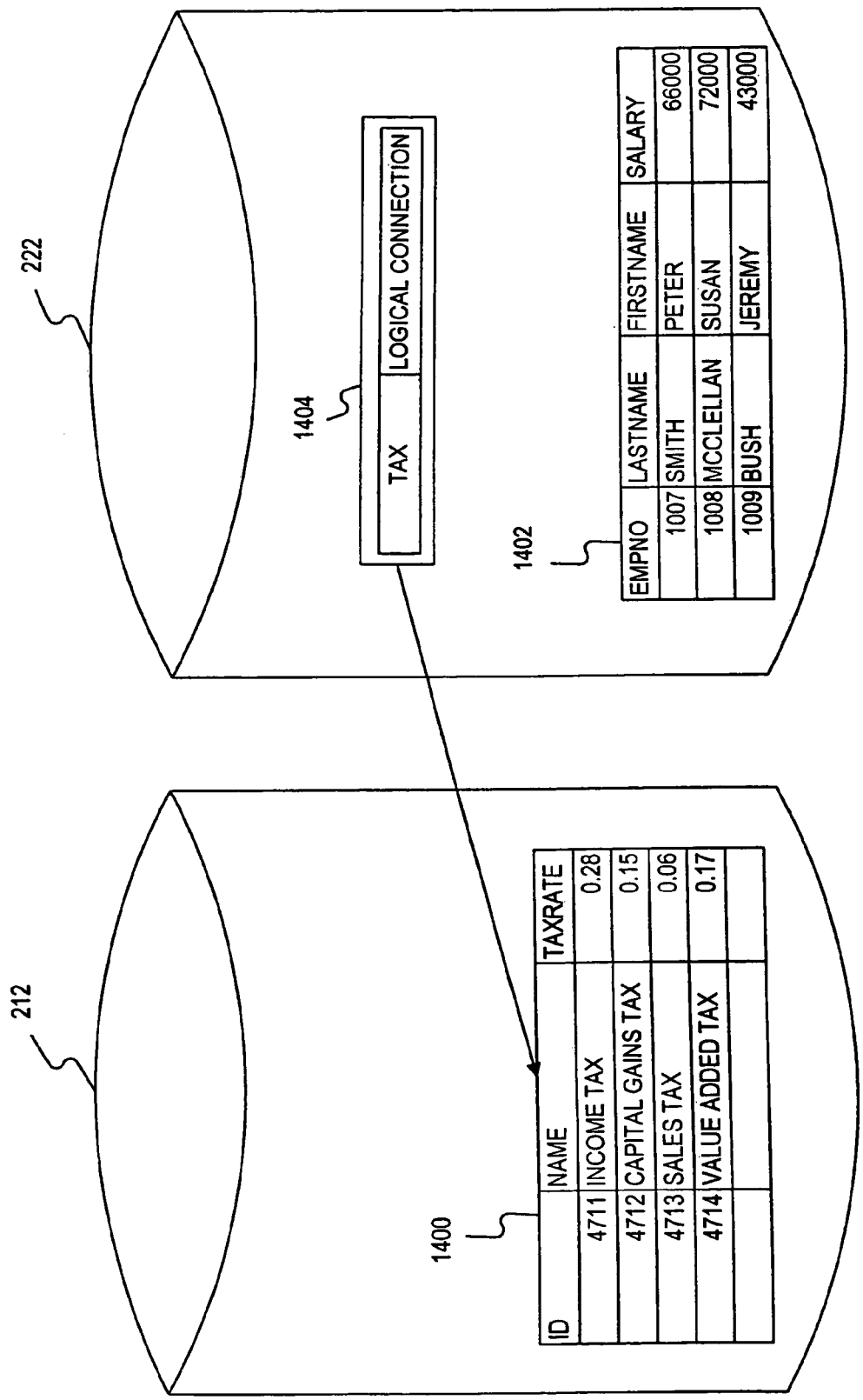
FIG. 14 illustrates an exemplary use of a table link, consistent with the present invention.

To further illustrate the use of table links 225, in one exemplary embodiment, table link 225 may be used to access and view a tax rate for a particular employee, as shown in FIG. 14. To calculate pay slips for employees of a tenant, a payroll software application may request current tax rates and payroll data for the tenant's company. In this exemplary embodiment, the tax rates may be stored in shared data structures 214 within provider database 212, because the tax rates are common to all tenants and accessible to all tenants. Therefore, tax table 1400 may be stored in the schema containing shared data structures 214 in provider database 212. As a result, all tenant stations 130 may access tax table 1400. Employee table 1402, however, may be stored in tenant database 222, because each company has different employees. All tenant stations 130 may thus not have access to employee table 1402. By way of example, employee table 1402 may include data such as an employee's identification number, last name, first name, and annual salary.

In this example, generator 802 may generate table link 1404 having an alternative name "TAX" for the shared data structure 1400, and a logical connection to the shared data structure 1400. The logical connection may be any type of valid connection, such as a database universal resource locator to tax table 1400. After creating table link 1404, table link 1404 may be stored at tenant database 222.

After table link 1404 is stored at tenant database 222, the payroll application may execute a query for the tax type or tax rate for a particular employee in the company. The payroll application running on tenant server 114 may be unaware that the requested data structure is located at provider database 212. Therefore, the payroll application's query may simply include a reference to tax table 1400. Tenant database 222 receives the query, and resolves that tax table 1400 is not located at tenant database 222. In one example, tenant database 222 checks the query against lookup table 1150 table and resolves that tax table 1400 relates to a table link 1404. Therefore, tenant database 222 sends another query to provider database 212, including table link 1404, in order to retrieve data from tax table 1400.

After receiving the query, provider database 212 determines that tax table 1400 is the requested shared data structure 214, and that tax table 1400 therefore contains the data requested by the payroll application. After provider database 212 determines that tax table 1400 contains the requested data, the requested data from tax table 1400 may be sent to tenant database 222. Once the data is available to the payroll application at tenant database 222, a tenant may perform any desired actions or operations by using the requested data.

For purposes of explanation only, certain aspects and embodiments are described herein with reference to the components illustrated in FIGS. 1-14. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-14 are exemplary and not intended to be limiting. Thus, other method steps may be used, and even with the methods depicted in FIGS. 1-14, the particular order of events may vary without departing from the scope of the present invention. Moreover, certain steps may not be present and additional steps may be implemented in FIGS. 1-14. Also, the processes described herein are not inherently related to any particular apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for hosting, at a provider server, application software for a plurality of tenants, the method comprising:
   storing, at the provider server, a shared data structure associated with the application software, wherein each of the plurality of tenants has access to the shared data structure;
   distributing, to each of the plurality of tenants, respective tenant-specific data structures for storing data unique to each respective tenant for storage at each respective tenant;
   defining the shared data structure and the tenant-specific data structures in a data dictionary;
   storing, at respective tenant servers, shared-metadata comprising definitions from the data dictionary and information reflecting a storage location of the shared data structure;
   providing, in response to a request from the application software and using the shared-metadata, data associated with the shared data structure to a first tenant of the plurality of tenants; and
   determining the storage location of the shared data structure based on the information.

2. The computer-implemented method of claim 1, wherein the sent shared data and the distributed tenant-specific data structure enables the first tenant to run the application software.

3. The computer-implemented method of claim 1, wherein distributing the tenant-specific data structures further includes:
   identifying data structures associated with the application software as tenant-specific data structures or shared data structures.

4. The computer-implemented method of claim 3, wherein:
   the data dictionary has reference attributes of data structures;
   identifying the data structures further includes identifying data structures as tenant-specific data structures or shared data structures based on the data dictionary; and
   each reference attribute is associated with at least one of a tenant-specific data structure and a shared data structure.

5. The computer-implemented method of claim 3, wherein identifying the data structures further includes:
   identifying data structures as tenant-specific data structures or shared data structures for each data structure associated with the application software.

6. A server system for hosting application software for a plurality of tenants, the system comprising:
   a memory including a program that:
      stores at least one shared data structure that is associated with the application software and that is shared by the plurality of tenants;
      stores at least one tenant-specific data structure unique to a particular one of the plurality of tenants, wherein the at least one tenant-specific data structure is transmitted, over a network, to the particular tenant for storage at the particular tenant; and
      defines the at least one shared data structure and at least one tenant-specific data structure in a data dictionary;
   a processor that runs the program;
   a database storing shared-metadata that describes a storage location of the at least one shared data structure; and
   a server for sending, to the particular tenant: shared metadata comprising definitions from the data dictionary;
      location information for the at least one shared data structure based on the information included in the shared-metadata; and
      the at least one shared data structure such that the particular tenant may execute the application software using the transmitted at least one shared data structure and the at least one tenant-specific data structure.

7. The system of claim 6, wherein the server transmits the at least one shared data structure in response to receiving a data request from the particular tenant.

8. The system of claim 7, wherein:
   the data dictionary comprises identifiers, associated with the metadata, that are used to identify the at least one tenant-specific data structure or at least one shared data structure.

9. The system of claim 8, wherein the data dictionary includes reference attributes and associates each reference attribute as corresponding to at least one of a tenant-specific data structure type and a shared data structure type.

10. The system of claim 9, wherein the server accesses the data dictionary to determine which of a plurality of data structures of the hosted application software are tenant-specific data structures or shared data structures.

11. A computer-implemented method for hosting, at a provider server, an application software for a plurality of tenants, the method comprising:
   storing at least one shared data structure associated with the application software, wherein each of the plurality of tenants has access to the shared data structure;
   storing at least one tenant-specific data structure for storing data unique to a particular one of the plurality of tenants;
   providing the tenant-specific data structure to the particular tenant for storage at the particular tenant;
   defining the at least one shared data structure and the at least one tenant-specific data structure in a data dictionary;
   storing, at respective tenant servers, shared-metadata comprising definitions from the data dictionary and shared-metadata that describes a storage location of the at least one shared data structure;
   sending, based upon a data request from the particular tenant executing the application software, data of the shared data structure to the particular tenant; and
   determining the location of the at least one shared data structure based on information included in the shared-metadata.

12. The computer-implemented method of claim 11, wherein the sent shared data and the stored tenant-specific data enables the particular tenant to run the application software.

13. The computer-implemented method of claim 11, further including:
   storing shared-metadata that describes a storage location of the shared data structure.

14. The computer-implemented method of claim 13, wherein sending the data of the shared data structure further includes:
   determining the location of the shared data structure based on information included in the shared-metadata.

* * * * *